US008027357B2

(12) United States Patent
Dispensa et al.

(10) Patent No.: US 8,027,357 B2
(45) Date of Patent: *Sep. 27, 2011

(54) BROADBAND WIRELESS COMMUNICATIONS USING MULTIPLE CONTENTION CHANNELS

(75) Inventors: Steve Dispensa, Leawood, KS (US); Emad M. Ramahi, Shawnee Mission, KS (US); John W. Montross, Stillwell, KS (US); Charles M. Woods, Lee's Summit, MO (US); Michael P. Denny, Chandler, AZ (US); Benjamin E. Bellinder, Overland Park, KS (US); George V. Moura, Gilbert, AZ (US); Dave McGinniss, Naperville, IL (US); Harry W. Perlow, Tarpon Springs, FL (US)

(73) Assignee: Sprint Communications Compnay L.P., Overland Park, KS (US)

( * ) Notice: Subject to any disclaimer, the term of this patent is extended or adjusted under 35 U.S.C. 154(b) by 257 days.

This patent is subject to a terminal disclaimer.

(21) Appl. No.: 11/450,794

(22) Filed: Jun. 8, 2006

(65) Prior Publication Data

US 2007/0147290 A1 Jun. 28, 2007

Related U.S. Application Data

(63) Continuation of application No. 09/981,193, filed on Oct. 17, 2001, now Pat. No. 7,113,494.

(51) Int. Cl.
*H04J 3/02* (2006.01)

(52) U.S. Cl. ........ 370/462; 370/330; 370/338; 370/341; 370/348; 370/401; 370/437; 370/443; 370/447; 370/461

(58) Field of Classification Search ............ 370/348, 370/251, 447, 328–341, 400, 401, 431, 437, 370/439, 443, 445, 461–462, 346, 442, 449
See application file for complete search history.

(56) References Cited

U.S. PATENT DOCUMENTS

| 5,463,629 | A  | * | 10/1995 | Ko ............................ 370/463 |
| 5,729,541 | A  | * | 3/1998  | Hamalainen et al. ......... 370/337 |
| 5,841,777 | A  | * | 11/1998 | Cohen ........................ 370/443 |
| 5,867,764 | A  | * | 2/1999  | Williams .................... 725/125 |
| 6,055,437 | A  | * | 4/2000  | Riley et al. .................. 455/511 |
| 6,185,224 | B1 | * | 2/2001  | Limb et al. ................... 370/459 |
| 6,532,225 | B1 | * | 3/2003  | Chang et al. ................. 370/341 |
| 7,002,934 | B2 | * | 2/2006  | Dolgonos et al. ............. 370/328 |
| 7,113,494 | B1 | * | 9/2006  | Dispensa et al. .............. 370/329 |
| 7,123,940 | B1 | * | 10/2006 | Rausch et al. ............. 455/562.1 |
| 7,266,080 | B1 | * | 9/2007  | Dispensa et al. .............. 370/230 |
| 7,287,672 | B2 | * | 10/2007 | Garcia ........................ 222/321.8 |
| 7,299,055 | B1 | * | 11/2007 | Phillips et al. ............. 455/456.1 |

FOREIGN PATENT DOCUMENTS

WO     WO 01/03324     *  6/2000

* cited by examiner

*Primary Examiner* — Christopher Grey

(57) ABSTRACT a communication system comprises a plurality of downstream transmission systems configured to transmit downstream wireless communications to an area having a plurality of sectors over a plurality of downstream channels to a plurality of users in the plurality of sectors and a plurality of upstream receiver systems configured to receive upstream wireless communications over a plurality of upstream channels from the plurality of users in the plurality sectors. In an embodiment, the plurality of upstream channels comprise multiple contention channels associated with each of the plurality of sectors and a plurality of bearer channels associated with each of the plurality of sectors and the plurality of upstream receiver systems are further configured to receive a plurality of requests from the plurality of users over the multiple contention channels for access to the plurality of bearer channels.

10 Claims, 14 Drawing Sheets

BROADBAND WIRELESS COMMUNICATIONS USING MULTIPLE CONTENTION CHANNELS

RELATED APPLICATIONS

This patent application is a continuation of U.S. patent application Ser. No. 09/981,193; filed on Oct. 17, 2001 now U.S. Pat. No. 7,113,494; entitled "BROADBAND WIRELESS COMMUNICATIONS USING MULTIPLE CONTENTION CHANNELS;" and hereby incorporated by reference into this patent application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a method and system for improved broadband wireless communications using multiple contention channels for upstream communications.

2. Description of the Prior Art

People and businesses are demanding higher bandwidths from their communication providers. Consequently, the communication providers are looking for ways to increase the bandwidth of their systems using broadband technologies. Broadband technologies are generally referred to as systems that deliver a bandwidth at or above 64 kbps. Broadband technologies can communicate over downstream channels and upstream channels. The customer receives data from another device or system over the downstream channels. The customer transmits data to another device or system over the upstream channels.

Broadband Wireline Systems

One example of a broadband technology is Digital Subscriber Line (DSL) service. DSL service can carry both voice signals and data signals at the same time in both directions. DSL service also can carry call information and customer data. DSL service is typically comprised of twisted-pair wires that connect a customer to a central office. The central office comprises a Digital Subscriber Line Access Multiplexer (DSLAM) that provides the DSL service to the customer. Unfortunately, the speed of DSL service is limited by the distance between the customer and the DSLAM. Customers located too far from the DSLAM may not be able to receive high-speed service. Also, there may not be enough customers within a particular area to make it economical to install a DSLAM. The quality of DSL service is also limited by the quality of the copper wire that connects the customer to the DSLAM. Furthermore, DSL service does not work over Digital Loop Carrier (DLC) lines.

Another broadband technology is cable modem service. The cable modem communicates with a device or system over a coaxial cable. The coaxial cable is typically the same coaxial cable used to receive cable television. The cable modem service can be one-way or two-way. In a two-way system, the coaxial cable carries both the upstream channels and the downstream channels. In a one-way system, the cable modem receives data on the downstream channels over the coaxial cable and transmits data on the upstream channels over a phone line. Unfortunately, the cable modem uses up valuable bandwidth on the phone line in the one-way system. Also, the upstream bandwidth is small over a phone line.

Broadband Wireless Systems

Another broadband technology is broadband wireless service. Customers that subscribe to broadband wireless service communicate with a head end. The head end is a system that transmits data to the customer. In a one-way wireless system, a transmitter antenna for the head end broadcasts wireless signals to the customer on the downstream channels. The transmitter antenna is a satellite antenna or a land-based antenna. The customer transmits data to the head end over another medium, such as a phone line or a cable modem, on the upstream channels. One example of a one-way wireless system is a Digital Satellite System (DSS) from DIRECTV®.

A specific type of broadband wireless system communicates over Multichannel Multipoint Distribution Service (MMDS) frequencies and Multipoint Distribution Service (MDS) frequencies. The MMDS frequencies range from 2596 MHz to 2644 MHz. The MDS frequencies range from 2150 MHz to 2162 MHz. In a typical MMDS system, the total bandwidth of the upstream channels, referred to as the upstream bandwidth, is about 6 MHz. Each of the upstream channels has a bandwidth of approximately 200 kHz.

The head end manages the upstream and downstream channels with the customer. The head end also interfaces the customer with communication systems such as the Internet. The head end includes a base antenna comprised of a transmitter antenna and one or more receiver antennas. MMDS requires a line of sight between devices that are communicating. Therefore, the antennas are placed on a high building or a mountain to establish lines of sight with the customers.

The transmitter antenna is omni-directional and broadcasts data from the head end to the customers on the downstream channels. In a two-way wireless system, the receiver antennas are positioned to receive MMDS signals transmitted from customers on the upstream channels. Each receiver antenna is positioned to receive MMDS signals from customers located within a certain area. The areas formed by the antennas are referred to as sectors. The sectors have designated frequency ranges or designated channels.

The head end is comprised of an upstream manager and a downstream manager that control transmissions on the upstream channels and the downstream channels, respectively. One of the upstream channels is a contention channel reserved for signaling, while the remaining upstream channels are bearer channels. The upstream manager uses the contention channel to control communications over the bearer channels.

In the broadband wireless system, a wireless broadband router is located at a customer premises. The wireless broadband router communicates with the upstream manager and the downstream manager to exchange data. The upstream manager generally operates the upstream channels in four states: idle, contention, polling, and dedicated. In the idle state, the upstream channels are idle. In the contention state, the upstream manager generates and transmits control signals over the contention channel.

For the polling and dedicated states, the upstream manager polls numerous wireless broadband routers to allocate use of the bearer channels. Polling is a round robin process to determine access to a bearer channel. The upstream manager maintains a queue of the active wireless broadband routers to determine which wireless broadband router is next to transmit over an upstream channel for a period of time. The upstream manager keeps an inventory of open upstream channels and waiting wireless broadband routers in the queue.

The upstream manager uses a credit to grant a wireless broadband router use of an upstream channel for a limited period of time. A credit is a message that allows usage of an upstream channel for a period of time or for the transfer of a maximum number of transmission units, such as bytes. One example of a credit is information, such as a particular upstream channel or frequency range, a maximum allowed time to transfer data, and a maximum number of bytes the wireless broadband router is allowed to transfer.

There are two kinds of credits: polling and dedicated. Polling credits are credits related to polling of the wireless broadband routers. Polling credits are generally smaller than the dedicated credits. Once the wireless broadband router completes transfer of the packets, the wireless broadband router transmits a DONE message to the upstream manager via the upstream channels. The DONE messages include information such as the number of bytes sent and the number of packets left for the wireless broadband router to transfer. A DONE message is one example of a termination message. The termination message is any signaling, instruction, or message that indicates termination of access for an upstream channel or completion of a transfer of information or data. Once the DONE message is received, the upstream manager then transmits another credit. If the DONE message shows that the wireless broadband router has more than three packets left to transfer and there are available upstream channels, then the upstream manager issues a dedicated credit to the wireless broadband router.

As stated above, the upstream manager and the downstream manager control transmissions over the upstream channels and the downstream channels. The upstream manager separates the upstream channels into a single contention channel and a plurality of bearer channels. The upstream manager receives requests over the contention channel for access to the bearer channels.

With current upstream managers, such as the CMU-2000-14C from Hybrid Networks, Inc., the upstream channels each have a bandwidth of approximately 200 kHz. With a total upstream bandwidth of approximately 6 MHz, the upstream manager controls about 28 upstream channels. One of the 28 upstream channels is the contention channel. The other 27 upstream channels are bearer channels.

Unfortunately, a single contention channel can limit the communication performance over the upstream channels. This can directly affect the overall performance of the broadband wireless system. The single contention channel and the overall bandwidth of the upstream channels also limit the number of bearer channels that can be used. Consequently, a limited number of bearer channels reduces the capacity of the broadband wireless system. This results in a fewer number of users of the broadband wireless service and a reduced amount of revenues received.

SUMMARY OF THE INVENTION

The invention helps to solve the above problems by using multiple contention channels for upstream wireless communications. The multiple contention channels advantageously increase the capacity and performance of a broadband wireless system. The increased capacity results in increased revenues generated from the broadband wireless system.

In an embodiment of the invention, a communication system comprises a plurality of downstream transmission systems configured to transmit downstream wireless communications to an area having a plurality of sectors over a plurality of downstream channels to a plurality of users in the plurality of sectors and a plurality of upstream receiver systems configured to receive upstream wireless communications over a plurality of upstream channels from the plurality of users in the plurality sectors. In an embodiment, the plurality of upstream channels comprise multiple contention channels associated with each of the plurality of sectors and a plurality of bearer channels associated with each of the plurality of sectors and the plurality of upstream receiver systems are further configured to receive a plurality of requests from the plurality of users over the multiple contention channels for access to the plurality of bearer channels.

In an embodiment of the invention, each upstream receiver system of the plurality of upstream receiver systems is configured to receive a portion of the upstream wireless communications respectively from each sector of the plurality of sectors respectively.

In an embodiment of the invention, each of the portions of the upstream wireless communications comprise the multiple contention channels associated with each of the sectors of the plurality of sectors respectively.

In an embodiment of the invention, each downstream transmission system of the plurality of downstream transmission systems is configured to transmit a portion of the downstream wireless communications to each sector of the plurality of sectors respectively.

In an embodiment of the invention, a first contention channel of the multiple contention channels is associated with a first group of bearer channels of the plurality of bearer channels.

In an embodiment of the invention, a second contention channel of the multiple contention channels is associated with a second group of bearer channels of the plurality of bearer channels.

In an embodiment of the invention, the downstream wireless communications are in a Multichannel Multipoint Distribution Service (MMDS) frequency range.

In an embodiment of the invention, the upstream wireless communications are in a Multichannel Multipoint Distribution Service (MMDS) frequency range.

In an embodiment of the invention, the plurality of upstream channels each have a bandwidth of less than 200 kiloHertz.

In an embodiment of the invention, a method of operating a communication system comprising transmitting downstream wireless communications to an area having a plurality of sectors over a plurality of downstream channels to a plurality of users in the plurality of sectors, receiving upstream wireless communications over a plurality of upstream channels from the plurality of users in the plurality sectors wherein the plurality of upstream channels comprise multiple contention channels associated with each of the plurality of sectors and a plurality of bearer channels associated with each of the plurality of sectors, and receiving a plurality of requests from the plurality of users over the multiple contention channels for access to the plurality of bearer channels.

A particular reference number in one figure refers to the same element in all of the other figures.

DETAILED DESCRIPTION OF THE INVENTION

Broadband Wireless System—FIGS. 1-6

FIGS. 1-6 depict a specific example of a broadband wireless system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 1-6 have been simplified or omitted for clarity.

Figure 1:
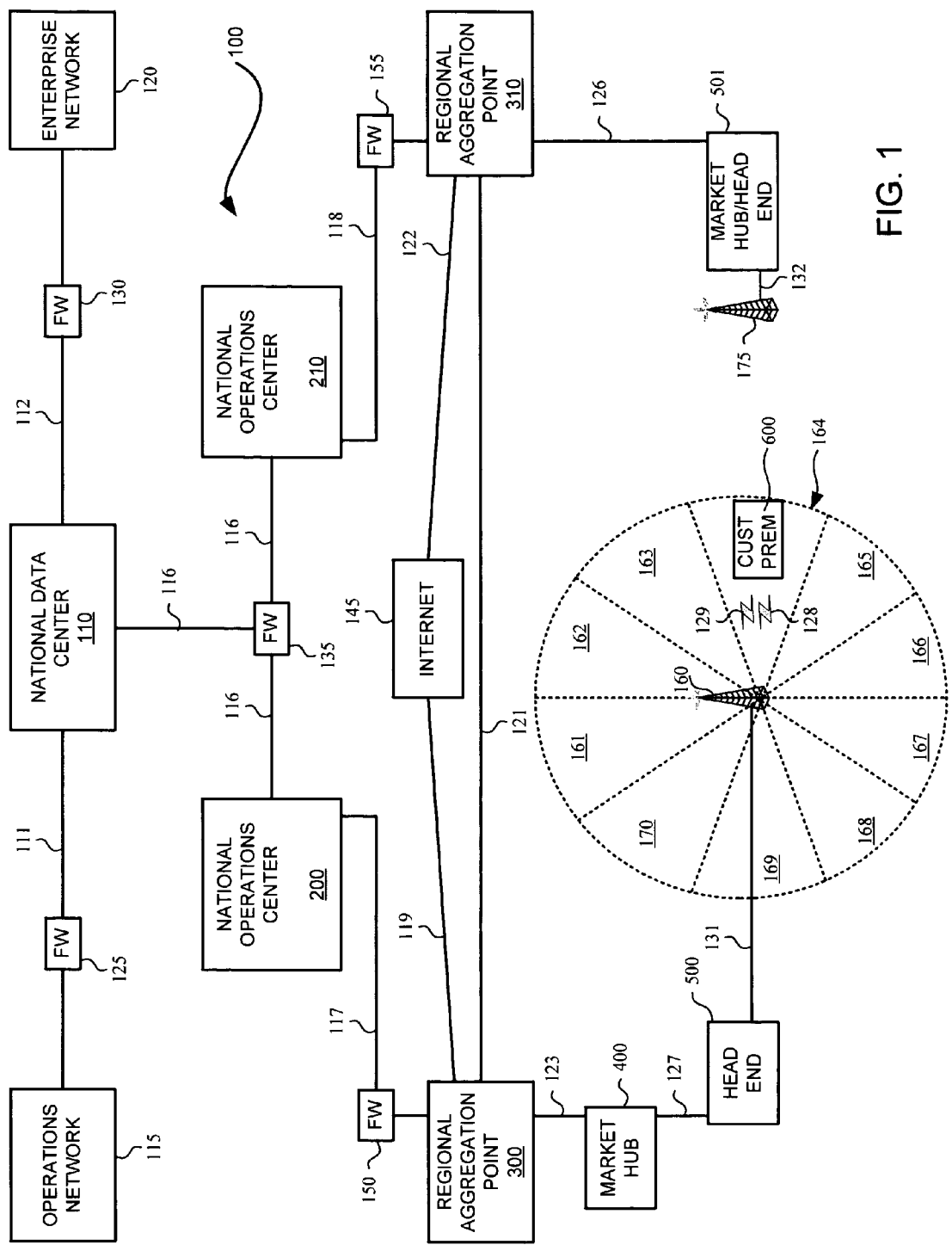
FIG. 1 is a block diagram of a broadband wireless system in an example of the invention.

FIG. 1 is a block diagram that illustrates a broadband wireless system 100 in an example of the invention. The broadband wireless system 100 is comprised of a national data center 110, an operations network 115, an enterprise network 120, a national operations center 200, a national operations center 210, an Internet 145, a regional aggregation point 300, a regional aggregation point 310, a market hub 400, a head end 500, a market hub/head end 501, and customer premises 600.

The national data center 110 is configured to compile and display network information for the broadband wireless system 100. Network information is data that can be evaluated to operate communication network, including performance information, fault information, billing information, and customer information. The operations network 115 is configured to process billing information, customer information, product ordering information, and another information generated from the broadband wireless system 100. The enterprise network 120 is an internal employee network configured to provide certain employees access to the network information for the broadband wireless system 100. The national operations center 200 is configured to route data within the broadband wireless system 100, collect network information for the broadband wireless system 100, and store the network information. The national operations center 200 is discussed in further detail in FIG. 2. The regional aggregation point 300 is configured to route data within the broadband wireless system 100, collect network information for the broadband wireless system 100, and store the network information. The regional aggregation point 300 is discussed in further detail in FIG. 3. The market hub 400 is configured to route data within the broadband wireless system 100, collect network information for the broadband wireless system 100, and store the network information. The market hub 400 is discussed in further detail in FIG. 4. The head end 500 is configured to communicate with a customer premises over a wireless link and collect network information. The head end 500 is discussed in further detail in FIG. 5. The customer premises is configured to communicate with a head end over a wireless link. The customer premises 600 is discussed in further detail in FIG. 6.

The following table describes how the components in FIG. 1 are connected. The first and second columns describe the components and the third column describes the link that connects the components.

| Component | Component | Link |
|---|---|---|
| National data center 110 | Operations network 115 | 111 |
| National data center 110 | Enterprise network 120 | 112 |
| National data center 110 | National operations center 200 | 116 |
| National data center 110 | National operations center 210 | 116 |
| National operations center 200 | National operations center 210 | 116 |
| National operations center 200 | Regional aggregation point 300 | 117 |
| National operations center 210 | Regional aggregation point 310 | 118 |
| Regional aggregation point 300 | Internet 145 | 119 |
| Regional aggregation point 300 | Regional aggregation point 310 | 121 |
| Regional aggregation point 310 | Internet 145 | 122 |
| Regional aggregation point 300 | Market hub 400 | 123 |
| Regional aggregation point 310 | Market hub/Head end 501 | 126 |
| Market hub 400 | Head end 500 | 127 |
| Head end 500 | Base antenna 160 | 131 |
| Base antenna 160 | Customer premises 600 | 128–29 |
| Market hub/Head end 501 | Base antenna 175 | 132 |

The links 111, 112 and 116-118 include firewalls (FW) 125, 130, 135, 150, and 155, respectively. A firewall is a system, hardware or software, configured to limit access to a system or network. The links 111, 112, 116-119, 121-123, and 126-127 are DS-3 connections. Those skilled in the art will appreciate that the links 111, 112, 116-119, 121-123, and 126-127 could be any type of electrical or optical connection including T-1, T-3, OC-3, OC-12, or OC-48 connections. Those skilled in the art will appreciate that the links 111, 112, 116-119, 121-123, and/or 126-127 could include redundant connections to increase reliability of the links.

The broadband wireless system 100 operates as follows. The customer premises 600 communicates with systems within the Internet 145. For instance, the customer premises 600 could download a web page from a server in the Internet 145. To download the web page, the customer premises 600 accesses the server through the head end 500, the market hub 400, and the regional aggregation point 300.

The national operations centers 200 and 210 collect network information for the broadband wireless system 100. The national operations center 200 retrieves network information from the regional aggregation point 300, the market hub 400, the head end 500, and the customer premises 600. Network information comprises performance information and fault information. The performance information is information that describes how a communication network is operating, such as throughput rates, number of transmission units, and signal-to-noise ratio. The fault information is information that identifies failures in a communication network, such as alarms and indicators of failed communication devices. The national operations center 200 processes and stores the network information. The national operations center 210 is a mirror system to the national operations center 200. The national operations center 210 retrieves and stores the same network information as the national operations center 200. Thus, if the national operations center 200 fails, then the national operations center 210 takes over without affecting the broadband wireless system 100.

The regional aggregation point 300 routes data through the broadband wireless system 100 and collects network information for the broadband wireless system 100. The regional aggregation point 300 retrieves network information from the market hub 400, the head end 500, and the customer premises 600. The regional aggregation point 300 stores the network information and exchanges the network information with the national operations center 200. The regional aggregation point 310 operates similar to the regional aggregation point 300.

The market hub 400 routes data from the head end 500 to the regional aggregation point 300 and vice-versa, and collects network information for the broadband wireless system 100. The market hub 400 retrieves network information from the head end 500 and the customer premises 600. The market hub 400 stores the network information and exchanges the network information with the national operations center 200 and the regional aggregation point 300.

The head end 500 interfaces the customer premises 600 with other components in the broadband wireless system 100 and routes data from the customer premises 600 to the market hub 400 and vice-versa. The head end 500 collects network information for the broadband wireless system 100. The head end 500 transfers the network information to the market hub 400, the regional aggregation point 300, and/or the national operations center 200. The market hub/head end 501 operates similarly to the market hub 400 and the head end 500.

The customer premises 600 exchanges data with the head end 500 over wireless links 128 and 129. The customer premises 600 has two-way wireless communication with the head end 500 because both the downstream and upstream channels are over the wireless links 128 and 129. Those skilled in the art will appreciate that the upstream link 128 could be over a non-wireless link, such as a phone line or a cable modem, which is within the scope of the invention. As shown in FIG. 1, the customer premises 600 resides within a sector 164 of a plurality of sectors 161-170, which are physical areas serviced by a base antenna 160 coupled with the head end 500 by way of a link 131.

Figure 2:
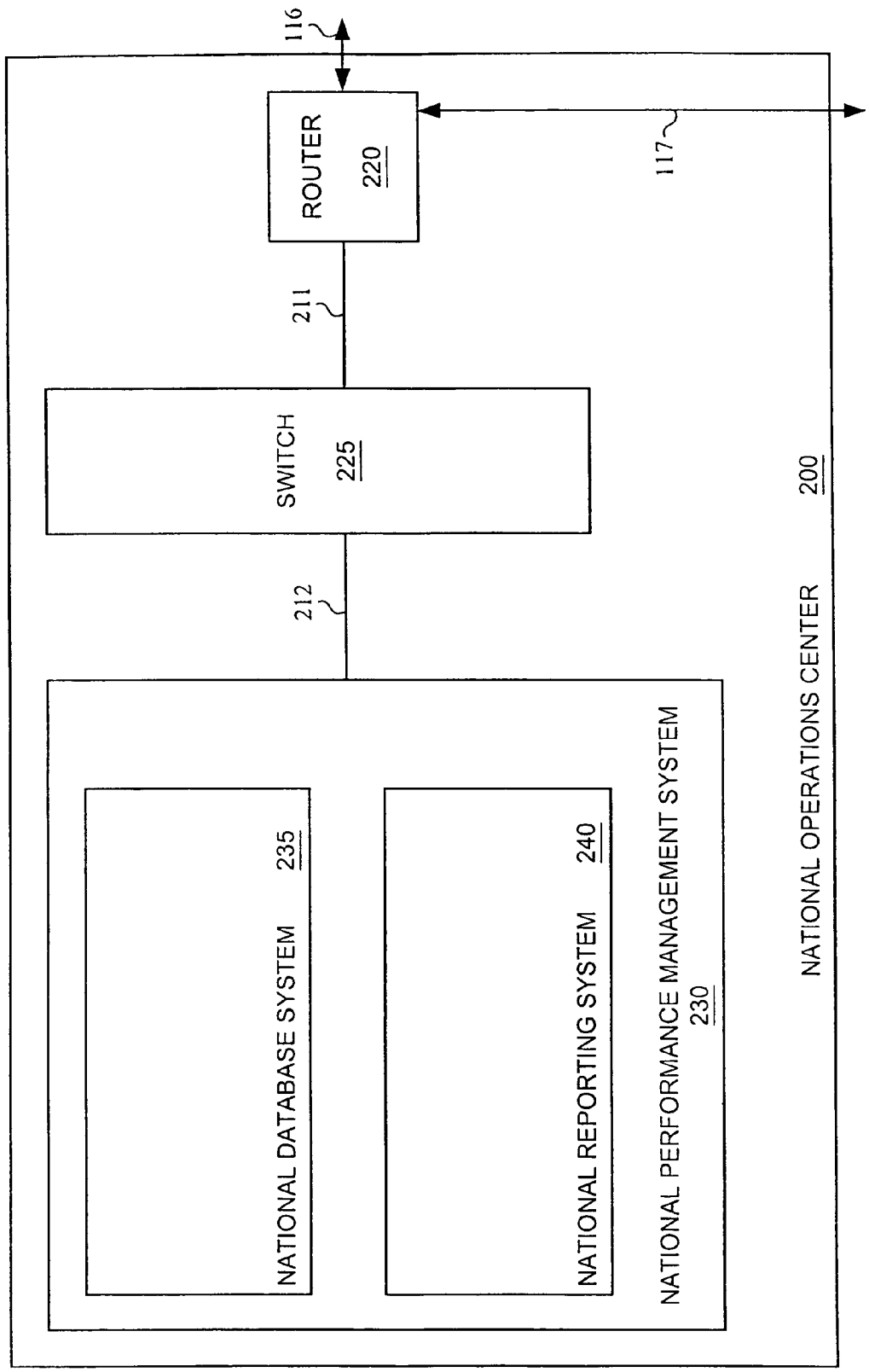
FIG. 2 is a block diagram of a national operations center in an example of the invention.

FIG. 2 is a block diagram that illustrates the national operations center 200 in an example of the invention. The national operations center 200 is comprised of a router 220, a switch 225, and a national performance management system 230. The national performance management system 230 is comprised of a national database system 235 and a national reporting system 240.

The national performance management system 230 is configured to collect, store, and report performance information for the broadband wireless system 100. The national database system 235 is configured to store performance information for the broadband wireless system 100. The national database system 235 is an Oracle database. The national reporting system 240 is configured to report the performance information for the broadband wireless system 100. The national reporting system 240 is an Apache web server.

The router 220 connects with the national data center 110, the national operations center 210, and the regional aggregation point 300 over the links 116 and 117. The router 220 connects with the switch 225 over a link 211. The link 211 is a Gigabit Ethernet connection. The switch 225 connects with the national performance management system 230 over a link 212.

In operation, the national performance management system 230 collects performance information from other components in the broadband wireless system 100. The national performance management system 230 communicates with the other components in the broadband wireless system 100 through the switch 225 and the router 220 to collect the performance information. The operation of the router 220 and the switch 225 is well known to those skilled in the art and is omitted for the sake of brevity. The national database system 235 stores the collected performance information. The national reporting system 240 retrieves the performance information from the national database system 235 and provides user-friendly formats of the performance information. Examples of the user-friendly formats are data files, HTML files, or other types of files. The national reporting system 240 provides other systems access to the performance information. For instance, a user system within the Internet 145 could access the national reporting system 240 and view the performance information using a Web browser. Also, the national data center 110 could retrieve the performance information from the national reporting system 240 through a File Transfer Protocol (FTP) command and store the performance information.

Figure 3:
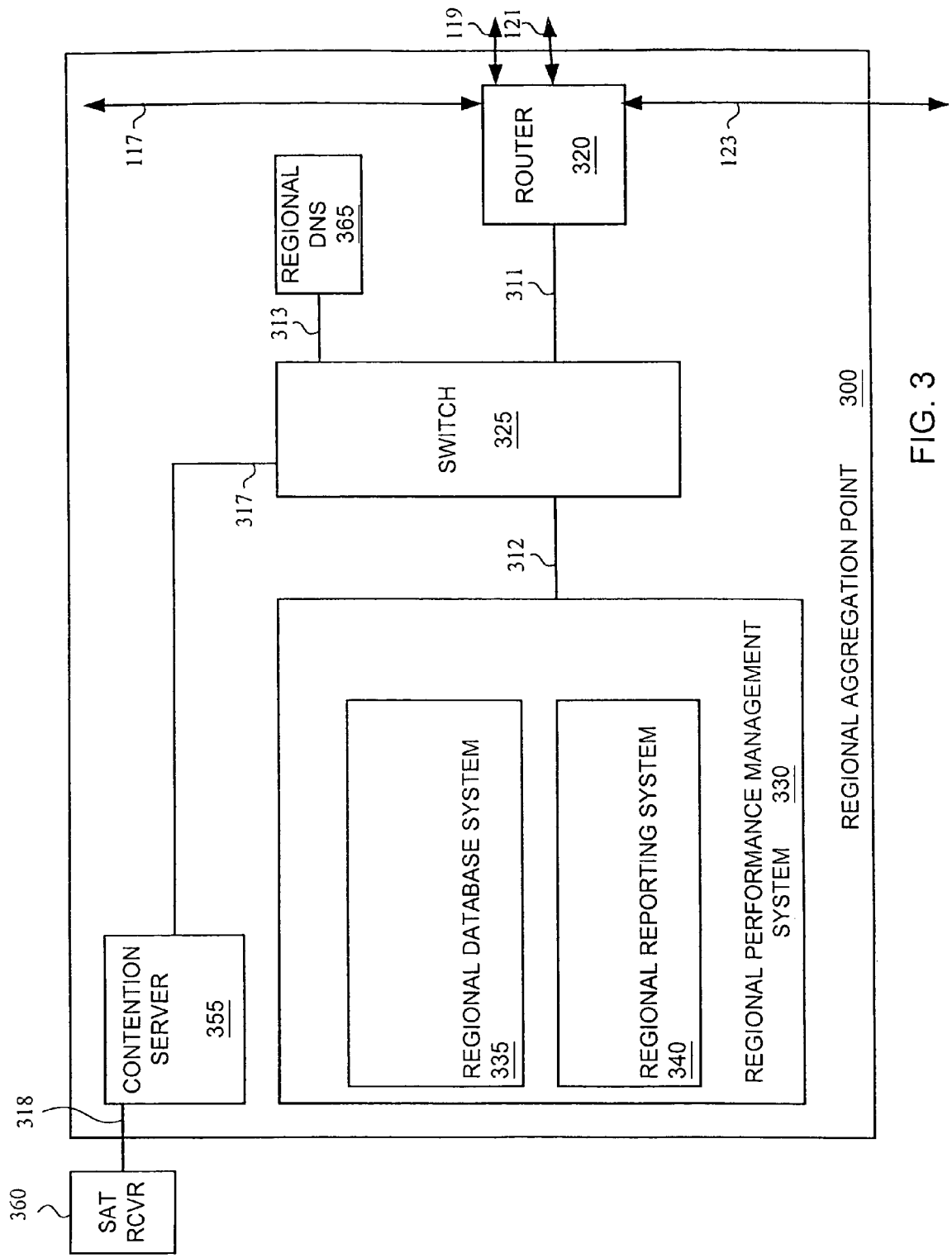
FIG. 3 is a block diagram of a regional aggregation point in an example of the invention.

FIG. 3 is a block diagram that illustrates the regional aggregation point 300 in an example of the invention. The regional aggregation point 300 is comprised of a router 320, a switch 325, a regional performance management system 330, a contention server 355, and a satellite receiver 360. The regional performance management system 330 is comprised of a regional database system 335 and a regional reporting system 340.

The router 320 is a GSR 12016 router from Cisco Systems. The switch 325 is a 6506 switch from Cisco Systems. The regional performance management system 330 is configured to collect, store, and report performance information for the broadband wireless system 100. The regional database system 335 is configured to store performance information for broadband wireless system 100. The regional database system 335 is an Oracle database. The regional reporting system 340 is configured to report performance information for the broadband wireless system 100. The regional reporting system 340 is an Apache web server. The contention server 355 and the satellite receiver 360 are from Cidera Co. The satellite receiver 360 is a Global Positioning System (GPS) receiver.

The router 320 connects with the national operations center 200, the Internet 145, the regional aggregation point 310, and the market hub 400 over the links 117, 119, 121 and 123, respectively. The router 320 connects with the switch 325 over a link 311. The link 311 is a Gigabit Ethernet connection. The switch 325 connects with the regional performance management system 330 over a link 312. The switch 325 connects with the contention server 355 over a link 317. The contention server 355 connects with the satellite receiver 360 over a link 318. The link 318 is a coaxial cable.

In operation, the regional performance management system 330 collects performance information for the broadband wireless system 100. The regional performance management system 330 communicates with other components in the broadband wireless system 100 through the switch 325 and the router 320 to collect the performance information. The operation of the router 320 and the switch 325 is well known to those skilled in the art and is not discussed for the sake of brevity. The regional database system 335 stores the collected performance information. The regional reporting system 340 retrieves the performance information from the regional database system 335 and provides user-friendly formats of the performance information. Examples of the user-friendly formats are data files, HTML files, or other types of files. The regional reporting system 340 provides other systems access to the performance information. For instance, a user system within the Internet 145 could access the regional reporting system 340 and view the performance information using a Web browser. Also, the national performance management system 230 could retrieve the performance information from the regional reporting system 340 for storage in the national database system 235.

In one embodiment, the regional aggregation point 300 also includes a regional domain name server (DNS) 365 coupled to the switch 325 via a link 313.

The contention server 355 receives configuration information from a content delivery network through the satellite receiver 360. The configuration information is used to pre-configure the regional performance management system 330. The configuration information is also used to update or re-configure the regional performance management system 330.

Figure 4:
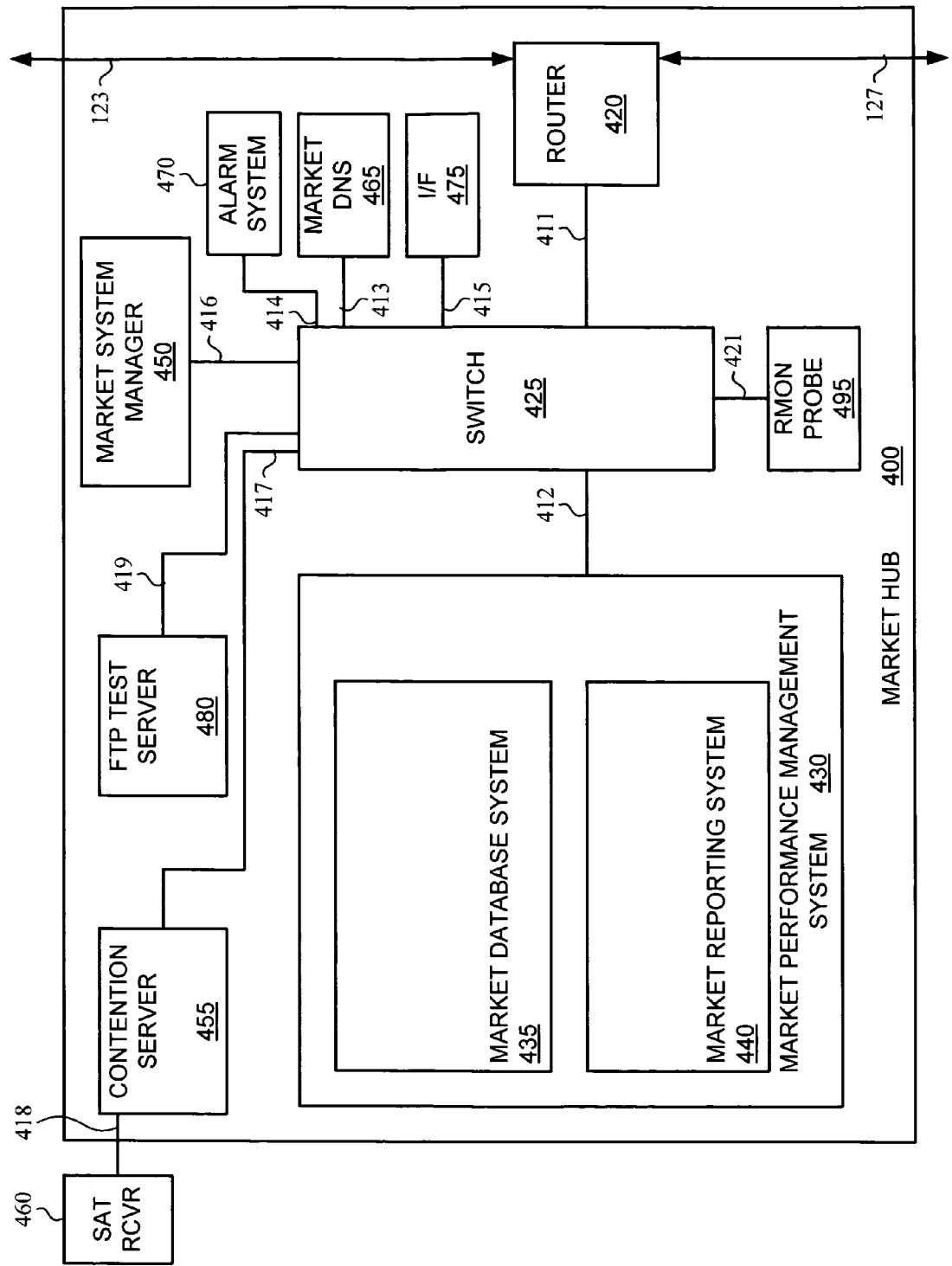
FIG. 4 is a block diagram of a market hub in an example of the invention.

FIG. 4 is a block diagram that illustrates the market hub 400 in an example of the invention. The market hub 400 is comprised of a router 420, a switch 425, a market performance management system 430, a market system manager 450, a contention server 455, and a satellite receiver 460. The market performance management system 430 comprises a market database system 435 and a market reporting system 440.

The router 420 is a series 7500 router from Cisco Systems. The market performance management system 430 is configured to collect, store, and report performance information for the broadband wireless system 100. The market database system 435 is configured to store performance information for the broadband wireless system 100. The market database system 435 is an Oracle database. The market reporting system 440 is configured to report performance information for the broadband wireless system 100. The market reporting system 440 is an Apache web server. The market system manager 450 is a CyberManager 2000 (CMG-2000) from Hybrid Networks, Inc. The contention server 455 and the satellite receiver 460 are from Cidera Co. The satellite receiver 460 is a Global Positioning System (GPS) receiver.

The router 420 connects with the regional aggregation point 300 and the head end 500 over the links 123 and 127, respectively. The router 420 connects with the switch 425 over a link 411. The link 411 is a Gigabit Ethernet connection. The switch 425 connects with the market performance management system 430 over a link 412. The switch 425 connects with the market system manager 450 over a link 416. The switch 425 connects with the contention server 455 over a link 417. The contention server 455 connects with the satellite receiver 460 over a link 418. The link 418 is a coaxial cable.

In operation, the market performance management system 430 collects performance information for the broadband wireless system 100. The market performance management system 430 communicates with other components in the broadband wireless system 100 through the switch 425 and the router 420 to collect the performance information. The operation of the router 420 and the switch 425 is well known to those skilled in the art and is not discussed for the sake of brevity. The market database system 435 stores the collected performance information. The market reporting system 440 retrieves the performance information from the market database system 435 and provides user-friendly formats of the performance information. Examples of the user-friendly formats are data files, HTML files, or other types of files. The market reporting system 440 provides other systems access to the performance information. For instance, a user system within Internet 145 could access the market reporting system 440 and view the performance information using a Web browser. Also, the national performance management system 230 and/or the regional performance management system 330 could retrieve the performance information from the market reporting system 440 for storage in the national database system 235 and the regional database system 335, respectively.

The market system manager 450 monitors and stores routing information for upstream and downstream routing within the broadband wireless system 100. The market system manager 450 provides other systems access to the routing information.

The contention server 455 receives configuration information from a content delivery network through the satellite receiver 460. The configuration information is used to pre-configure the market performance management system 430 or the market system manager 450. The configuration information is also used to update or re-configure the market performance management system 430 or the market system manager 450.

In one embodiment, the market hub 400 also includes a market domain name server (DNS) 465, an alarm system 470, an interface 475, a file transfer protocol (FTP) test server 480, and an RMON probe 495, each of which is coupled to the switch 425 via links 413, 414, 415, 419 and 421, respectively.

Figure 5:
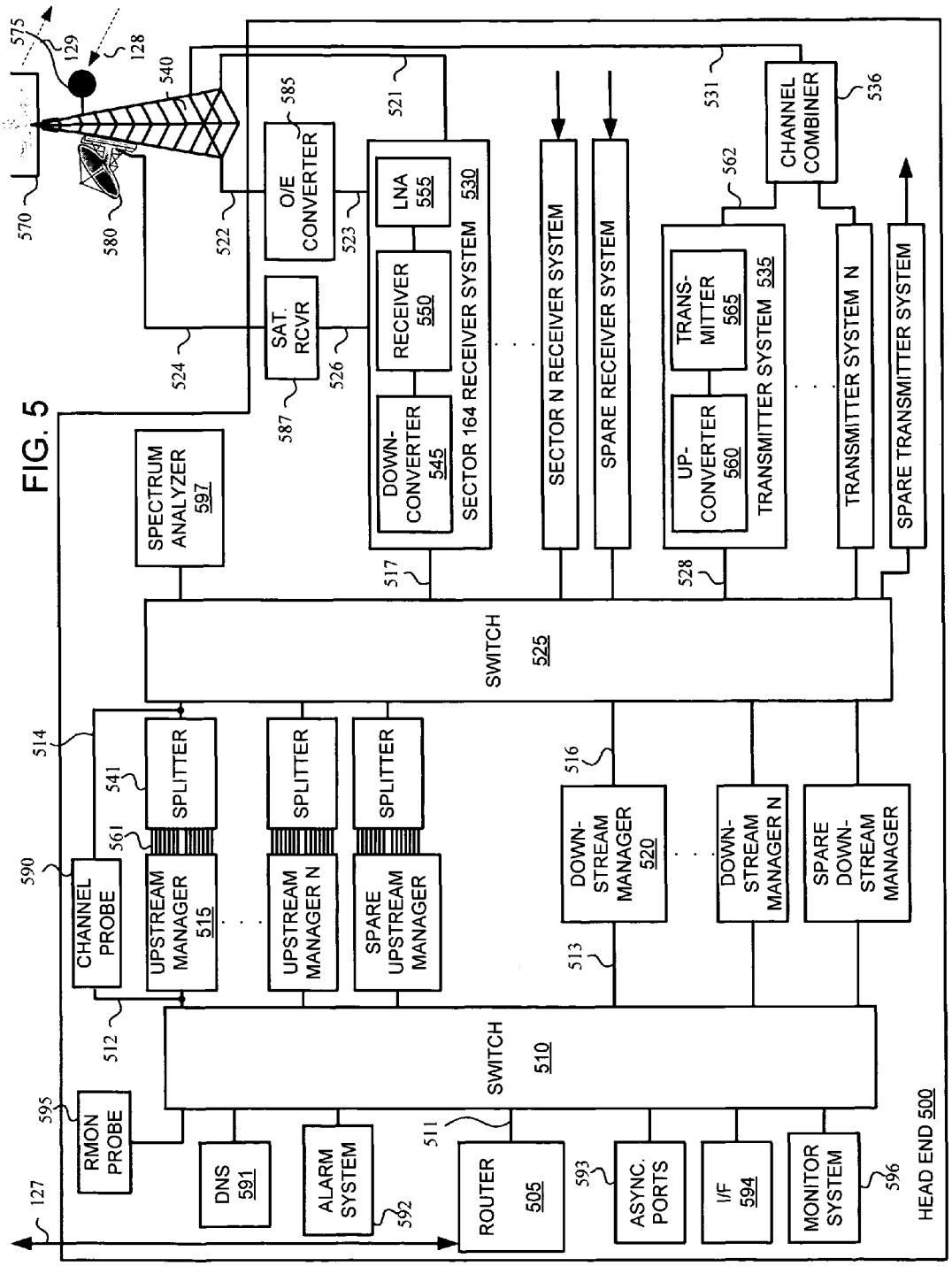
FIG. 5 is a block diagram of a head end in an example of the invention.

FIG. 5 is a block diagram that illustrates the head end 500 in an example of the invention. The head end 500 is comprised of a router 505, a switch 510, an upstream manager 515, a downstream manager 520, a patch panel 525, a receiver system 530, a transmitter system 535, an Optical-to-Electrical (O/E) converter 585, a satellite receiver 587, and a base antenna 540. The receiver system 530 is comprised of a down-converter 545, a receiver 550, and a Low Noise Amplifier (LNA) 555. The transmitter system 535 is comprised of an up-converter 560 and a transmitter 565. The base antenna 540 is comprised of a transmitter antenna 570, a receiver antenna 575, and a satellite antenna 580. The head end 500 also includes a channel probe 590 and a Remote MONitoring (RMON) probe 595.

Those skilled in the art will appreciate that the base antenna 540 could be positioned at a high altitude to improve communications. For instance, the base antenna 540 could be positioned on a mountain or a tall building. Consequently, the base antenna 540 could be placed at a remote location in relation to the head end 500. The base antenna 540 has a range of approximately 35 miles.

The router 505 is a 7500 series router from Cisco Systems. The switch 510 is a 6500 series switch from Cisco Systems. The upstream manager 515 is configured to manage data on upstream channels. The upstream manager 515 is a Cyber-Master Upstream Router (CMU-2000-14C) from Hybrid Networks, Inc. The downstream manager 520 is configured to manage data on downstream channels. The downstream manager 520 is a CyberMaster Downstream Router (CMD-2000) from Hybrid Networks, Inc. The patch panel 525 is from PESA Switching Systems, Inc. The receiver system 530 is configured to receive a Radio Frequency (RF) signal and convert the RF signal into an Intermediate Frequency (IF) signal. The receiver system 530 is a receiver from ADC Telecommunications Co. The transmitter system 535 is configured to receive an IF signal and convert the IF signal into an RF signal. The base antenna 540 is an antenna from Andrew Corp. The RMON probe 595 is a NetScout probe from NetScout Systems, Inc.

The router 505 connects with the market hub 400 over the link 127. The router 505 connects with the switch 510 over a link 511. The link 511 is a Gigabit Ethernet connection. The switch 510 connects with the upstream manager 515 over a link 512 and the downstream manager 520 over a link 513. The upstream manager 515 connects with the patch panel 525 over a link 514. The downstream manager 520 connects with the patch panel 525 over a link 516. The links 512-514 and 516 are configured to transport Transmission Control Protocol/Internet Protocol (TCP/IP) packets.

The patch panel 525 connects with the receiver system 530 over a link 517. The link 517 is configured to transport an IF signal. The receiver system 530 connects with the receiver antenna 575 of the base antenna 540 over a link 521. The link 521 is a wire cable configured to transport an RF signal.

The receiver system 530 connects with the satellite receiver 587 over a link 526. The satellite receiver 587 connects with the satellite antenna 580 on the base antenna 540 over a link 524. The links 526 and 524 are coaxial cables.

The receiver system 530 connects to the O/E converter 585 over a link 523. The O/E converter 585 connects with the receiver antenna 575 on the base antenna 540 over a link 522. The link 522 is a fiber optic cable.

The patch panel 525 connects with the transmitter system 535 over a link 528. The link 528 is configured to transport an IF signal. The transmitter system 535 connects with the transmitter antenna 570 on the base antenna 540 over a link 531. The link 531 is a wire cable configured to transport an RF signal.

The channel probe 590 connects to the links 512 and 514. The configuration and operation of the channel probe 590 is discussed in further detail in FIGS. 14-16. The RMON probe 595 connects to the link 511. The configuration and operation of the RMON probe 595 is discussed in further detail in FIGS. 22-24.

The head end 500 operates as follows. The head end 500 communicates with the market hub 400 and the customer premises 600. The downstream manager 520 routes data to the customer premises 600. The data could be from other components in the broadband wireless system 100. The downstream manager 520 communicates with the other components through the switch 510 and the router 505. The operation of the router 505 and the switch 510 is well known to those skilled in the art and is not discussed for the sake of brevity.

The downstream manager 520 receives packets that contain the data from the switch 510 over the link 513. The downstream manager 520 processes the packets to extract the data. The downstream manager 520 converts the data into an IF signal. The downstream manager 520 transmits the IF signal to the transmitter system 535 through the patch panel 525 over the links 516 and 528. The up-converter 560 and the transmitter 565 function together to process the IF signal and convert the IF signal into an RF signal. The transmitter system 535 then transmits the RF signal to the transmitter antenna 570 over the link 531.

The transmitter antenna 570 is an omni-directional antenna. The transmitter antenna 570 transmits the RF signal to the customer premises 600 on downstream channels over the link 129. The RF signal is a Multichannel Multipoint Distribution Service (MMDS) signal. The MMDS frequencies range from 2596 MHz to 2644 MHz. The MMDS signals in this example also include the Multipoint Distribution Service (MDS) frequencies. The MDS frequencies comprise MDS1 (2150-2156 MHz) and MDS2 (2156-2162 MHz). The bandwidth of the downstream channels is approximately 8 Mbps.

Concurrently, the upstream manager 515 routes data received from the customer premises 600 to the broadband wireless system 100. The upstream manager 515 communicates with other components in the broadband wireless system 100 through the switch 510 and the router 505.

The upstream manager 515 receives the data from the customer premises 600 through the receiver system 530 and the receiver antenna 575. The receiver antenna 575 is a directional antenna. The receiver antenna 575 forms a "sector" in the direction in which it points. Any communication device that communicates with the receiver antenna 575 is considered within the sector. Those skilled in the art will appreciate that the base antenna 540 could include a plurality of receiver antennas forming a plurality of sectors. Those skilled in the art will also appreciate that the head end 500 could include a plurality of upstream managers and receiver systems depending on the number of sectors controlled by the head end 500.

The receiver antenna 575 receives an RF signal from the customer premises 600 on the upstream channel over the link 128. The RF signal is also an MMDS signal. The bandwidth of the upstream channel is approximately 200 kbps.

The receiver antenna 575 transfers the RF signal over the link 521 to the receiver system 530. The LNA 555 amplifies the RF signal. The receiver 550 and the down-converter 545 function together to process the amplified RF signal and convert the amplified RF signal into an IF signal. The receiver system 530 transfers the IF signal to the upstream manager 515 through the patch panel 525 over the links 517 and 514. The patch panel 525 connects many devices together. For instance, if the head end 500 controlled ten sectors, then the patch panel 525 would connect ten upstream managers to ten receiver systems.

The upstream manager 515 receives the IF signal through the patch panel 525. The upstream manager 515 processes the IF signal to route the data carried by the IF signal. The upstream manager 515 generates packets and inserts the data, carried by the IF signal, into the packets. The upstream manager 515 transmits the packets to the switch 510 for transmission to other components in the broadband wireless system 100.

The upstream manager 515 also generates control messages for the customer premises 600. The upstream manager 515 transmits these control messages to the downstream manager 520 through the switch 510. The downstream manager 520 transmits the control messages to a wireless broadband router that is located at the customer premises 600. The wireless broadband router communicates with the upstream manager and the downstream manager to exchange data.

The upstream manager 515 polls numerous wireless broadband routers to allocate use of the upstream channels. Polling is a round robin process to determine which wireless broadband router has access to one or more of the upstream channels. The upstream manager 515 maintains a queue of the active wireless broadband routers to determine which wireless broadband router is next to transmit over the upstream channels for a period of time.

The upstream manager uses the control messages to grant a wireless broadband router use of one or more of the upstream channels for a limited period of time. The control messages are credits. A credit is a message that allows usage of one or more of the upstream channels for a period of time or for the transfer of a maximum number of transmission units such as bytes. One example of a credit includes information such a particular upstream channel or frequency range, a maximum allowed time to transfer data, and a maximum number of bytes the wireless broadband router is allowed to transfer.

There are two kinds of credits: polling and dedicated. Polling credits are credits related to polling of the wireless broadband routers. Polling credits are generally smaller than the dedicated credits. Once the wireless broadband router completes transfer of the packets, the wireless broadband router transmits a DONE message to the upstream manager 515 via the upstream channels. The DONE messages include information such as the number of bytes sent and the number of packets left for the wireless broadband router to transfer. If the DONE message shows that the wireless broadband router has more than three packets left to transfer and there is an available upstream channel, then the upstream manager 515 issues a dedicated credit to the wireless broadband router.

The receiver system 530 also receives a 10 MHz signal from the satellite receiver 587. The satellite antenna 580 receives satellite signals and transmits the satellite signals to the satellite receiver 587 over the link 524. The satellite receiver 587 processes the satellite signals to generate the 10 MHz signal. The satellite receiver 587 transmits the 10 MHz signal to the receiver system 530 over the link 526. The receiver system 530 uses the 10 MHz signal as a reference signal.

In some examples, the receiver system 530 communicates with the receiver antenna 575 over the links 522-523 and the O/E converter 585. In this example, the link 522 is a fiber optic cable. Depending on the number of receiver antennas on the base antenna 540, the number of wire cables, such as the link 521, running from the base antenna 540 could become large. A large number of wire cables can be heavy and can add stress to the structure of the base antenna 540. Conversely, fiber optic cable can be lighter than wire cable. Therefore, it may be advantageous to run fiber optic cable between the base antenna 540 and the receiver system 530. In such a case, the O/E converter 585 is used to convert the optical signal to an electrical signal.

In one embodiment, the head end 500 also includes a DNS 591, an alarm system 592, a collection of asynchronous ports 593, an interface 594 and a monitor system 596, each of which is coupled with switch 510. Also, the head end 500, as depicted in FIG. 5, also includes a channel combiner 536 for coupling a plurality of transmitter systems 535 to the link 531. The channel combiner 536 and the transmitter system 535 are coupled via a link 562.

Figure 6:
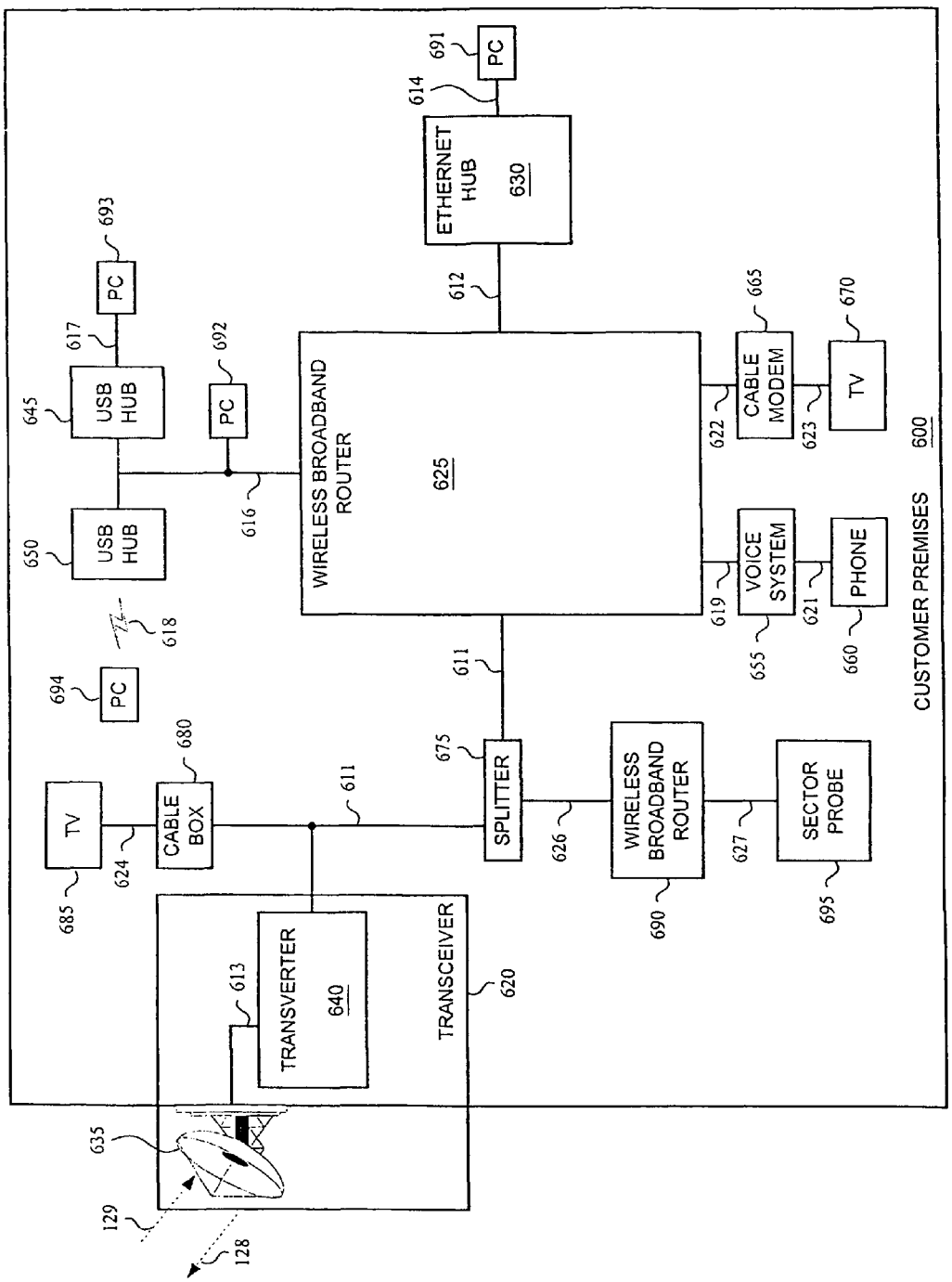
FIG. 6 is a block diagram of a customer premises in an example of the invention.

FIG. 6 is a block diagram that illustrates the customer premises 600 in an example of the invention. The customer premises 600 is comprised of a transceiver 620, a wireless broadband router 625, an Ethernet hub 630, and a computer (PC) 691. The transceiver 620 is comprised of a directional antenna 635 and a transverter 640. The customer premises 600 also includes a Universal Serial Bus (USB) hub 645, a USB hub 650, a voice system 655, a phone 660, a cable modem 665, a TV 670, a cable box 680, a TV 685, a splitter 675, a wireless broadband router 690, and a sector probe 695.

Examples of the customer premises 600 are residences or businesses. The transceiver 620 is configured to transmit and receive a wireless signal. The transceiver 620 is a transceiver from California Amplifier, Inc. The wireless broadband router 625 is configured to process packets to generate an IF signal, and vice-versa. The wireless broadband router 625 is a Series 2000 Wireless Broadband Router from Hybrid Networks, Inc. The Ethernet hub 630 is configured to interface multiple Ethernet connections. The Ethernet hub 630 is an Ethernet Hub from Netgear.

The USB hub 645 is a USB hub from Lucent Technologies. The USB hub 650 is an 802.11 wireless Ethernet standard hub from Lucent Technologies. The voice system 655 is configured to process voice data that is transmitted over packets. The splitter 675 is a 3 dB splitter. The wireless broadband router 690 is a Series 2000 Wireless Broadband Router from Hybrid Networks, Inc. The sector probe 695 is configured to collect network information from the customer premises side.

The directional antenna 635 connects with the transverter 640 over a link 613. The link 613 is a coaxial cable. The transverter 640 connects with the wireless broadband router 625 over a link 611. The link 611 is an RG-59 coaxial cable. The wireless broadband router 625 connects with the Ethernet hub 630 over a link 612. The Ethernet hub 630 connects with the PC 691 over a link 614. The links 612 and 614 are Ethernet connections. Those skilled in the art will appreciate that the Ethernet hub 630 could also communicate with a Local Area Network (not shown).

The wireless broadband router 625 connects with a USB 616. The USB 616 connects with the PC 692, the USB hub 645, and the USB hub 650. The USB hub 645 connects with the PC 693 over a link 617. The link 617 is an Ethernet connection. The USB hub 650 connects with the PC 694 over a link 618. The link 618 is a wireless Ethernet connection. The wireless broadband router 625 connects with the voice system 655 over a link 619. The voice system 655 connects with a phone 660 over a link 621. The wireless broadband router 625 connects with the cable modem 665 over a link 622. The cable modem 665 connects with the TV 670 over a link 623. The link 623 is a coaxial cable. The cable box 680 connects with the link 611 and is configured to receive a cable television feed. The cable box 680 connects with the TV 685 over a link 624. The link 624 is a coaxial cable.

The link 611 includes the splitter 675. The wireless broadband router 690 connects with the splitter 675 over a link 626. The link 626 is a coaxial cable. The wireless broadband router 690 connects with the sector probe 695 over a link 627.

Those skilled in the art will appreciate that the transceiver 620, the cable box 680, the voice system 655, the cable modem 665, the USB hub 645, the USB hub 650, and the Ethernet hub 630 could be incorporated within the wireless broadband router 625.

The customer premises 600 operates as follows. The customer premises 600 communicates with the head end 500. To receive data from the head end 500, the directional antenna 635 receives an RF signal on the downstream channel over the link 129. The directional antenna 635 transfers the RF signal to the transverter 640. The transverter 640 processes the RF signal and converts the RF signal to an IF signal. The transverter 640 transmits the IF signal to the wireless broadband router 625 over the link 611. The wireless broadband router 625 processes the IF signal and converts the IF signal into packets containing the data. The wireless broadband router 625 transmits the packets to the Ethernet hub 630 over the link 612. Those skilled in the art will appreciate that the wireless broadband router 625 could transmit packets to the USB hub 645, the USB hub 650, the PC 692, the voice system 655, and the cable modem 665. The Ethernet hub 630 transmits the packets to the PC 691 over the link 614.

To transmit data to the head end 500, the PC 691 transmits packets, containing data, to the Ethernet hub 630 over the link 614. The Ethernet hub 630 transfers the packets to the wireless broadband router 625 over the link 612. The wireless broadband router 625 processes the packets and converts the data contained in the packets into an IF signal. Those skilled in the art will appreciate that the wireless broadband router 625 could also receive packets from the USB hub 645, the USB hub 650, the PC 692, the voice system 655, and the cable modem 665. The wireless broadband router 625 transfers the IF signal to the transverter 640 over the link 611. The transverter 640 processes the IF signal and converts the IF signal into an RF signal. The transverter 640 also amplifies the RF signal. The transverter 640 transmits the RF signal to the directional antenna 635. The directional antenna 635 transmits the RF signal to the head end 500 on the upstream channel over the link 128.

Figure 7:
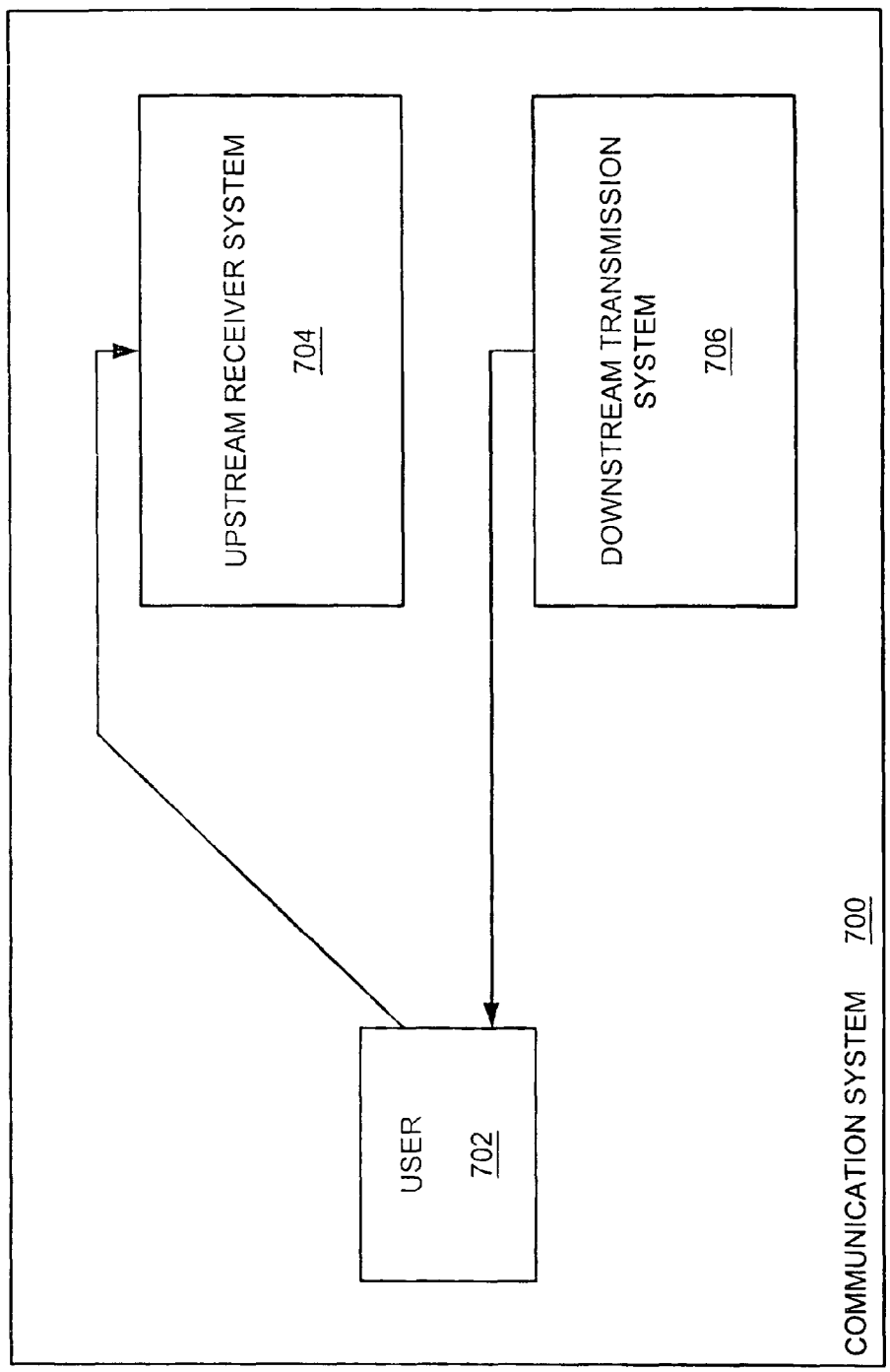
FIG. 7 is a block diagram of a communication system in the prior art.
Figure 8:
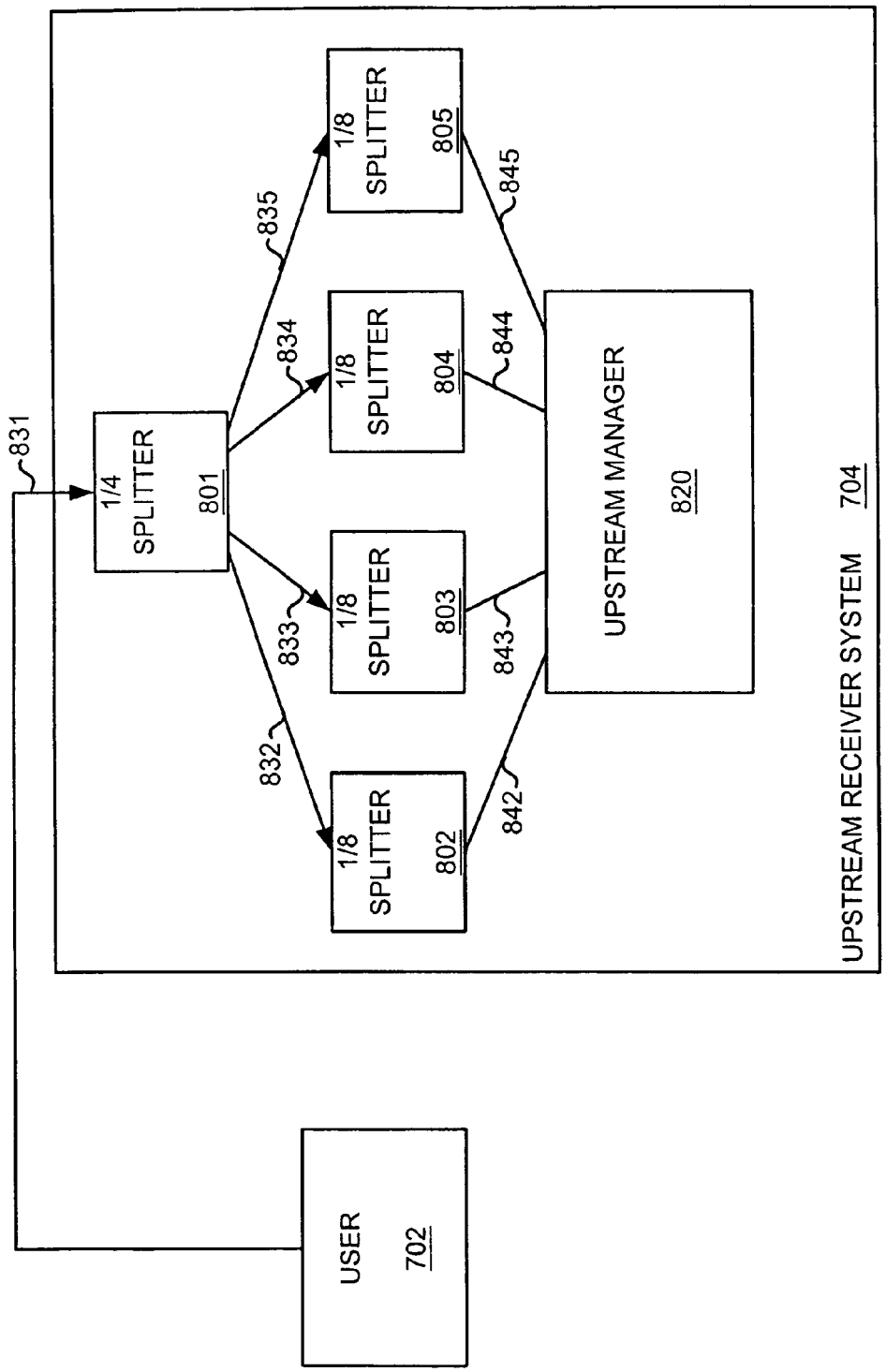
FIG. 8 is a block diagram an upstream receiver system in the prior art.

Prior Art Communication System—FIGS. 7-8

FIGS. 7-8 disclose a communication system in the prior art to better illustrate the invention or inventions and the advantages thereof.

FIG. 7 depicts a block diagram of a communication system 700 in the prior art that uses a single contention channel. Communication system 700 is comprised of a user 702, an upstream receiver system 704, and a downstream transmission system 706. Upstream receiver system 704 and downstream transmission system 706 each communicate with user 702.

In operation, downstream transmission system 706 transmits downstream wireless communications over downstream channels to user 702. Upstream receiver system 704 receives upstream wireless communications over upstream channels from user 702. The upstream channels include the single contention channel and a plurality of bearer channels. Upstream receiver system 704 receives a request over the single contention channel from user 702. The request is for access to the plurality of bearer channels for the upstream wireless communications. Upstream receiver system 704 then grants user 702 access to one or more of the plurality of bearer channels responsive to the request.

FIG. 8 depicts a block diagram of upstream receiver system 704 in the prior art. Upstream receiver system 704 is comprised of splitters 801-805 and an upstream manager 820. Splitter 801 is coupled to splitters 802-805. Splitters 802-805 are each coupled to upstream manager 820. Splitter 801 is a 1-to-4 splitter. Splitters 802-805 are 1-to-8 splitters. Splitter 802 is coupled to upstream manager 820 by link 842, where link 842 includes 4 cables. Splitter 803 is coupled to upstream manager 820 by link 843, where link 843 includes 8 cables. Splitter 804 is coupled to upstream manager 820 by link 844, where link 844 includes 8 cables. Splitter 805 is coupled to upstream manager 820 by link 845, where link 845 includes 8 cables. Each cable carries a signal for one channel.

In operation, splitter 801 receives an RF signal 831 from user 702. Splitter 801 splits the RF signal into 4 signals and transfers a corresponding signal 832-835 to each of the splitters 802-805. Splitter 802 splits signal 832 and transfers a corresponding split signal over link 842. Splitter 803 splits signal 833 and transfers a corresponding split signal over link 843. Splitter 804 splits signal 834 and transfers a corresponding split signal of signal 834 over link 844. Splitter 805 splits signal 835 and transfers a corresponding split signal of signal 835 over link 845.

Upstream manager 820 receives the signals over links 842-845. Link 842 represents 4 channels, link 843 represents 8 channels, link 844 represents 8 channels, and link 845 represents 8 channels for a total of 28 upstream channels. Upstream manager 820 operates one of the 28 upstream channels as a single contention channel. The remaining 27 upstream channels are bearer channels. The total bandwidth of the upstream channels is 6 MHz. Each upstream channel has a bandwidth of 200 kHz.

Upstream manager 820 receives a request over the single contention channel from user 702. The request is for access to the one or more of the 27 bearer channels for the upstream wireless communications. Upstream manager 820 then grants user 702 access to one or more of the bearer channels responsive to the request. One example of granting access is transmitting a credit as discussed above. The single contention channel can limit the communication performance of upstream manager 820 over the upstream channels.

Figure 9:
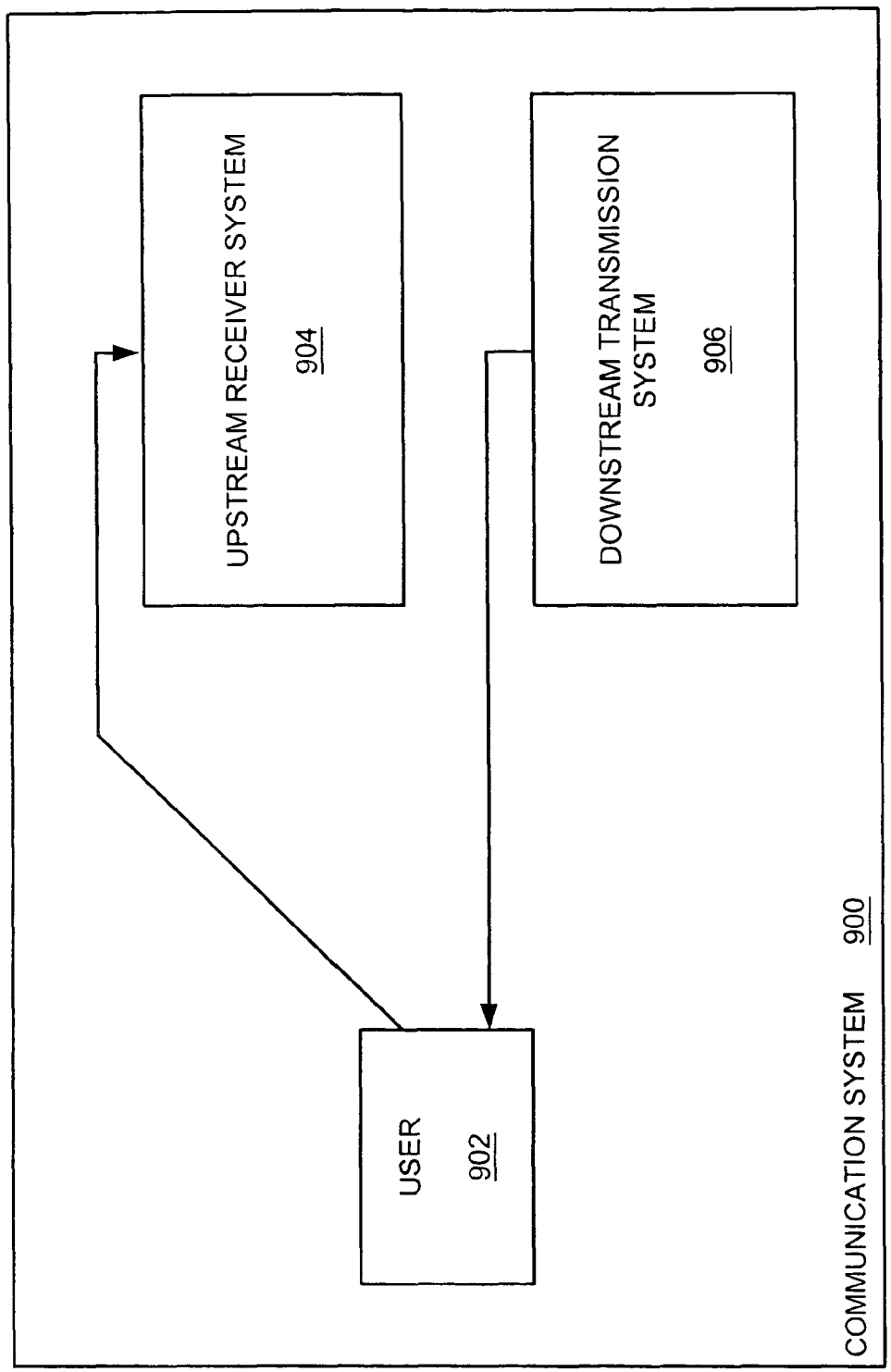
FIG. 9 is a block diagram of a communication system in an example of the invention.
Figure 10:
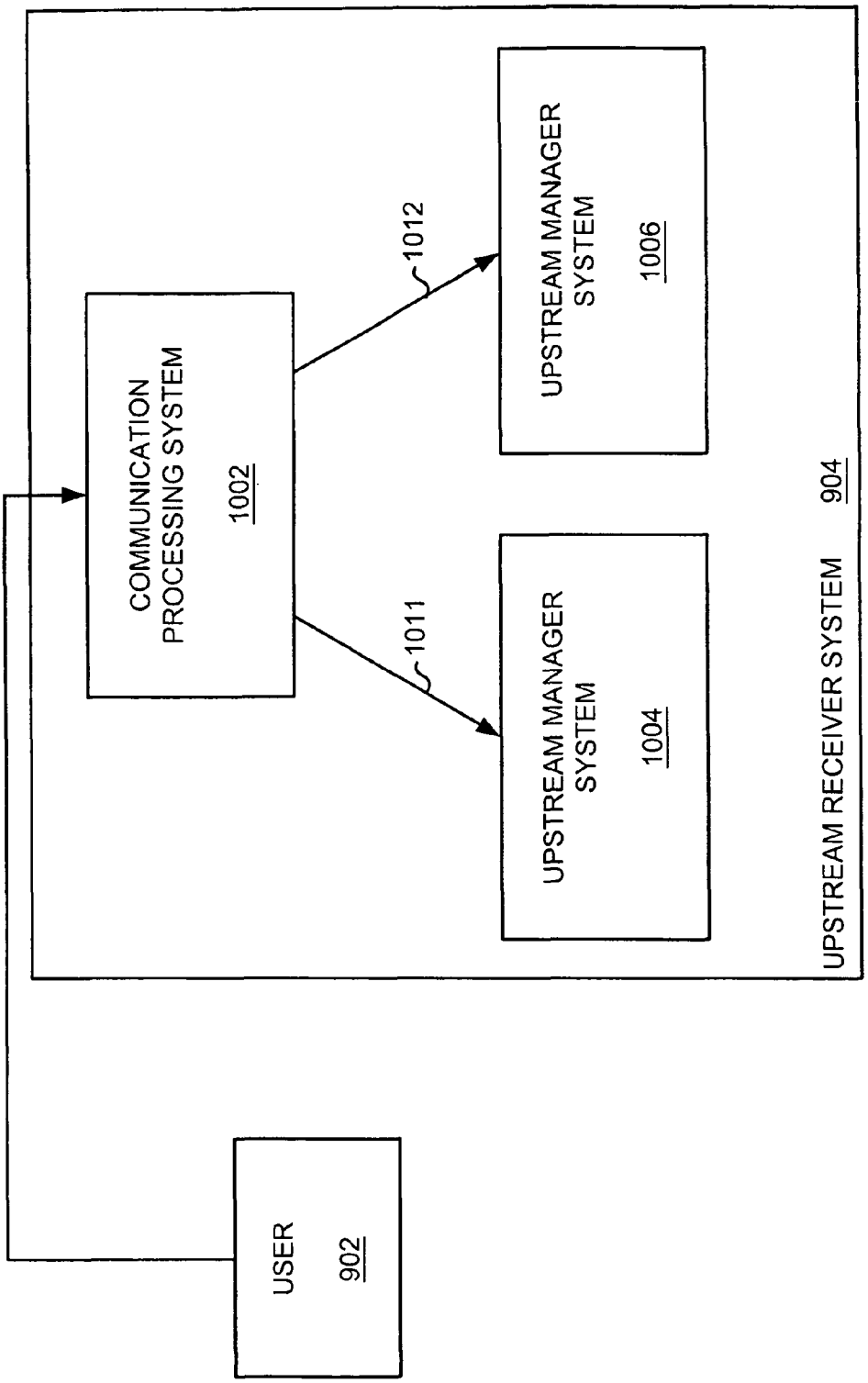
FIG. 10 is a block diagram an upstream receiver system in an example of the invention.
Figure 11:
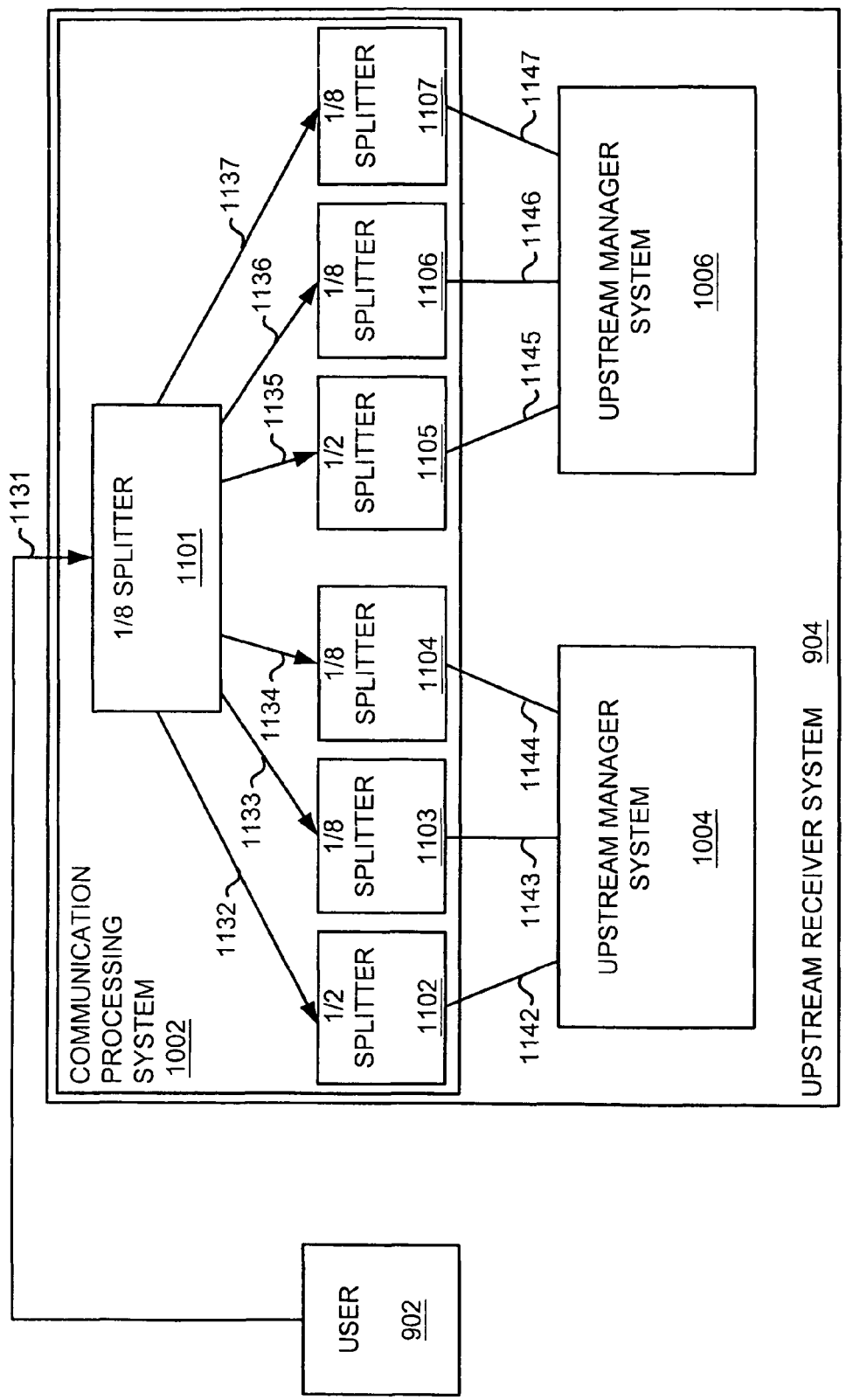
FIG. 11 is a block diagram of a splitter system in an example of the invention.

Communication System with Multiple Contention Channels—FIGS. 9-11

FIGS. 9-11 disclose embodiments of the invention, but the invention is not restricted to the configuration provided below. Those skilled in the art will appreciate numerous variations in a communication system configuration and operation that are within the scope of the invention. Those skilled in the art will also appreciate how the principles illustrated in this example can be used in other examples of the invention.

FIG. 9 depicts a block diagram of a communication system 900 in an example of the invention. Communication system 900 is comprised of an upstream receiver system 904 and a downstream transmission system 906. Upstream receiver system 904 and downstream transmission system 906 are each configured to communicate with a user 902.

In operation, downstream transmission system 906 transmits downstream wireless communications to user 902 over a plurality of downstream channels. Upstream receiver system 904 receives upstream wireless communications from user 902 over a plurality of upstream channels. The plurality of upstream channels includes more than one contention channel and a plurality of bearer channels. Upstream receiver system 904 receives requests from user 902, over the multiple contention channels, for access to the plurality of bearer channels for the upstream wireless communications.

Those skilled in the art will appreciate that the components in FIG. 9 could relate to components in FIGS. 5-6. For instance, user 902 could relate to customer premises 600 in FIG. 6. Upstream receiver system 904 could relate to sector 164 receiver system 530, splitter 541, and upstream manager 515 in FIG. 5. Downstream receiver system 906 could relate to transmitter system 535 and downstream manager 520 in FIG. 5. Although the components in FIG. 9 could relate to components in FIGS. 5-6 as shown above, the invention illustrated in FIG. 9 is not limited to the embodiment(s) illustrated in FIGS. 5-6.

In one example, upstream receiver system 904 grants user 902 access to the plurality of bearer channels for the upstream wireless communications by generating a credit and transmitting the credit to user 904 as discussed above. In another example, the upstream wireless communications is communications in a Multichannel Multipoint Distribution Service (MMDS) frequency range.

FIG. 10 depicts a block diagram of an example of upstream receiver system 904 in an example of the invention. FIG. 10 illustrates one possible embodiment of upstream receiver system 904 and upstream receiver system 904 is not limited to the embodiment shown in FIG. 10. In this example, upstream receiver system 904 is comprised of a communication processing system 1002 and upstream manager systems 1004 and 1006. Communication processing system 1002 is coupled to upstream manager system 1004 and upstream manager system 1006.

In operation, communication processing system 1002 receives the upstream wireless communication from user 902 over the plurality of upstream channels. Communication processing system 1002 splits the plurality of upstream channels into a first group 1011 of upstream channels and a second group 1012 of upstream channels. The first group 1011 of upstream channels includes a first contention channel and a first portion of the plurality of bearer channels. The second group 1012 of upstream channels includes a second contention channel and a second portion of the plurality of bearer channels. Communication processing system 1002 transfers first upstream communications over the first group 1011 of upstream channels. Communication processing system 1002 transfers second upstream communications over the second group 1012 of upstream channels.

Upstream manager system 1004 receives first requests from user 902 over the first contention channel. The first requests are for access to the first portion of the plurality of bearer channels. Upstream manager system 1004 then grants user 902 access to the first portion of the plurality of bearer channels responsive to the first requests.

Upstream manager system 1006 receives second requests from user 902 over the second contention channel. The second requests are for access to the second portion of the plurality of bearer channels. Upstream manager system 1006 grants user 902 access to the second portion of the plurality of bearer channels responsive to the second requests.

FIG. 11 depicts a block diagram of an example of communication processing system 1002 within upstream receiver system 904 in an example of the invention. Upstream receiver system 904 is comprised of a communication processing system 1002, a first upstream manager system 1004, and a second upstream manager system 1006. FIG. 11 illustrates one possible embodiment of communication processing system 1002 and communication processing system 1002 is not limited to the embodiment shown in FIG. 11. In this example, communication processing system 1002 is comprised of splitters 1101-1107. Splitters 1101, 1103-1104, and 1106-1107 are 1-to-8 splitters. Splitters 1102 and 1105 are 1-to-2 splitters. Splitter 1101 is coupled to splitters 1102-1107. Splitters 1102-1104 are each coupled to upstream manager system 1104. Splitters 1105-1107 are each coupled to upstream manager system 1106. Splitter 1102 is coupled to upstream manager system 1004 by link 1142, where link 1142 includes 2 cables. Splitter 1103 is coupled to upstream manager system 1104 by link 1143, where link 1143 includes 8 cables. Splitter 1104 is coupled to upstream manager system 1004 by link 1144, where link 1144 includes 8 cables. Splitter 1105 is coupled to upstream manager system 1006 by link 1145, where link 1145 includes 2 cables. Splitter 1106 is coupled to upstream manager system 1006 by link 1146, where link 1146 includes 8 cables. Splitter 1107 is coupled to upstream manager system 1006 by link 1147, where link 1147 includes 8 cables.

In operation, splitter 801 receives a signal 1131 from user 902. Splitter 801 splits the signal 1131 into 6 signals and transfers a corresponding signal 1132-1137 to each of splitters 1102-1107. Splitter 1102 splits signal 1132 and transfers a corresponding split signal over link 1142. Splitter 1103 splits signal 1133 and transfers a corresponding split signal over link 1143. Splitter 1104 splits signal 1134 and transfers a corresponding split signal of signal 1134 over link 1144. Splitter 1105 splits signal 1135 and transfers a corresponding split signal of signal 1135 over link 1145. Splitter 1106 splits signal 1136 and transfers a corresponding split signal of signal 1136 over link 1146. Splitter 1107 splits signal 1137 and transfers a corresponding split signal of signal 1137 over link 1147.

Upstream manager system 1004 receives the signals over links 1142-1144. Link 1142 represents 2 channels, link 1143 represents 8 channels, and link 1144 represents 8 channels for a total of 18 upstream channels for upstream manager system 1004. Upstream manager system 1104 operates one of the 18 upstream channels as a contention channel. The remaining 17 upstream channels are bearer channels. For instance, upstream manager system 1004 receives a request from user 902 over the contention channel. The request is for access to the one or more of the 17 bearer channels for the upstream wireless communications. Upstream manager system 1004 then grants user 904 access to one or more of the bearer channels responsive to the request.

Upstream manager system 1006 receives the signals over links 1145-1147. Link 1145 represents 2 channels, link 1146 represents 8 channels, and link 1147 represents 8 channels for a total of 18 upstream channels for upstream manager system 1006. Upstream manager system 1106 operates one of the 18 upstream channels as a contention channel. The remaining 17 upstream channels are bearer channels. For instance, upstream manager system 1006 receives a request from user 902 over the contention channel. The request is for access to the one or more of the 17 bearer channels for the upstream wireless communications. Upstream manager system 1006 then grants user 904 access to one or more of the bearer channels responsive to the request.

Upstream manager system 1004 and upstream manager system 1006 control a total of 36 upstream channels. The total bandwidth of the upstream channels is approximately 6 MHz. Thus, the bandwidth of each of the upstream channels is less than 200 kHz. For instance, the bandwidth could be 166 kHz or 160 kHz.

With the above embodiment of communication processing system 1002 and upstream manager systems 1004 and 1006, the upstream receiver system 904 operates using two contention channels and 34 bearer channels. As stated before, prior systems only have one contention channel. Consequently, upstream receiver system 904 has improved performance over prior systems because it has more than one contention channel and more bearer channels.

Figure 12:
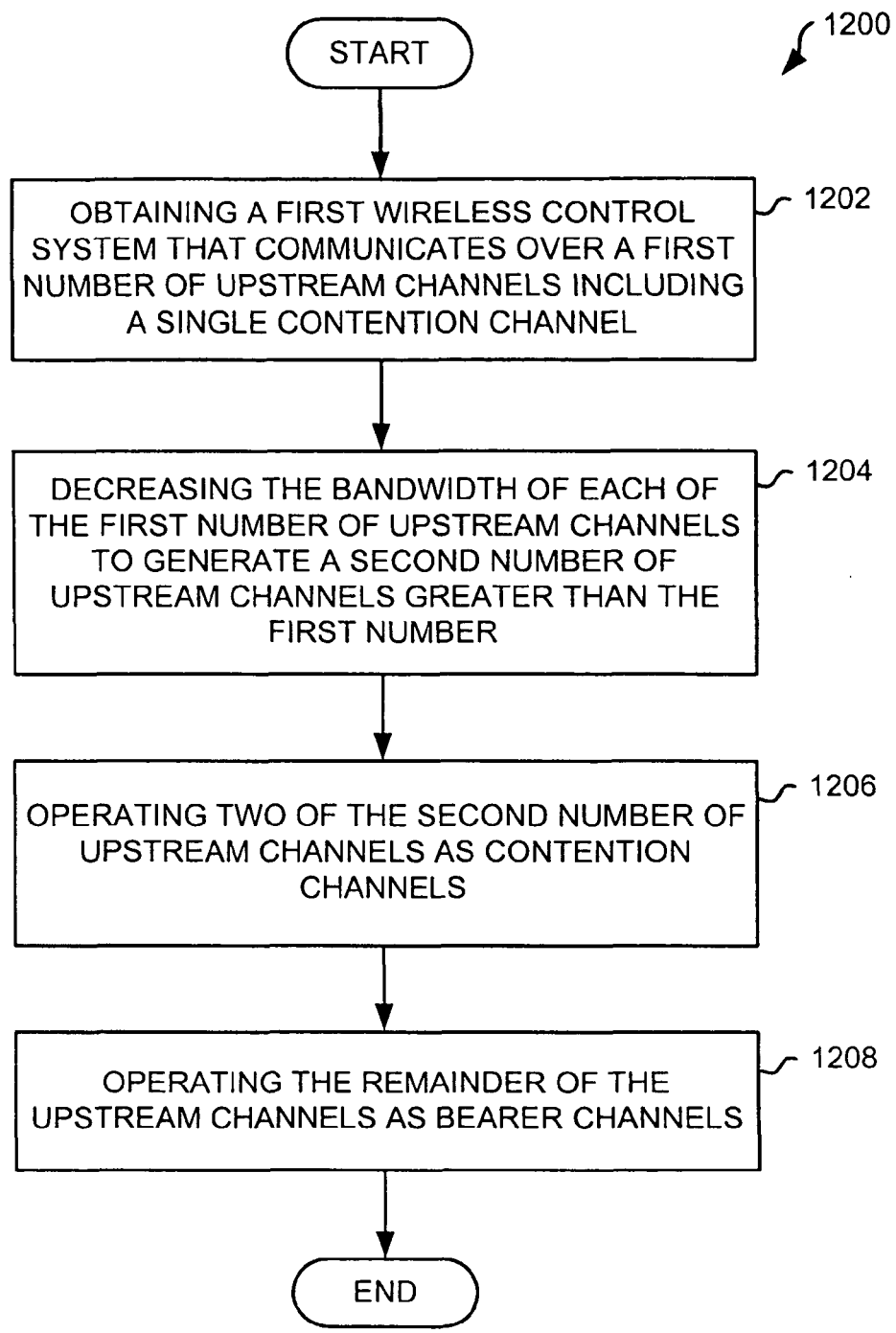
FIG. 12 is a flow diagram of a method of adjusting a communication system for increased performance in an example of the invention.
Figure 13:
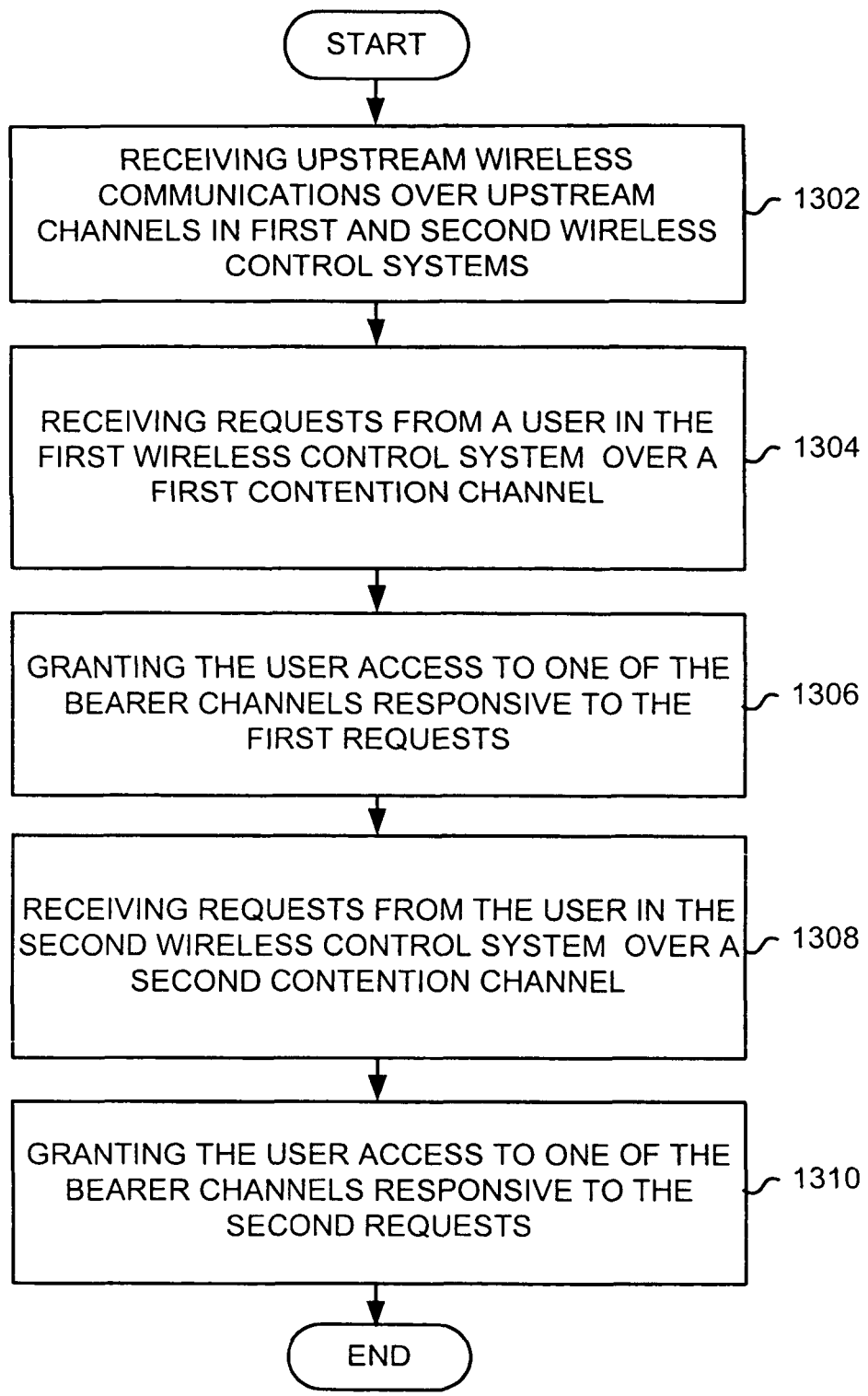
FIG. 13 depicts a flow diagram of one example of further steps of the method of FIG. 12 in an example of the invention.
Figure 14:
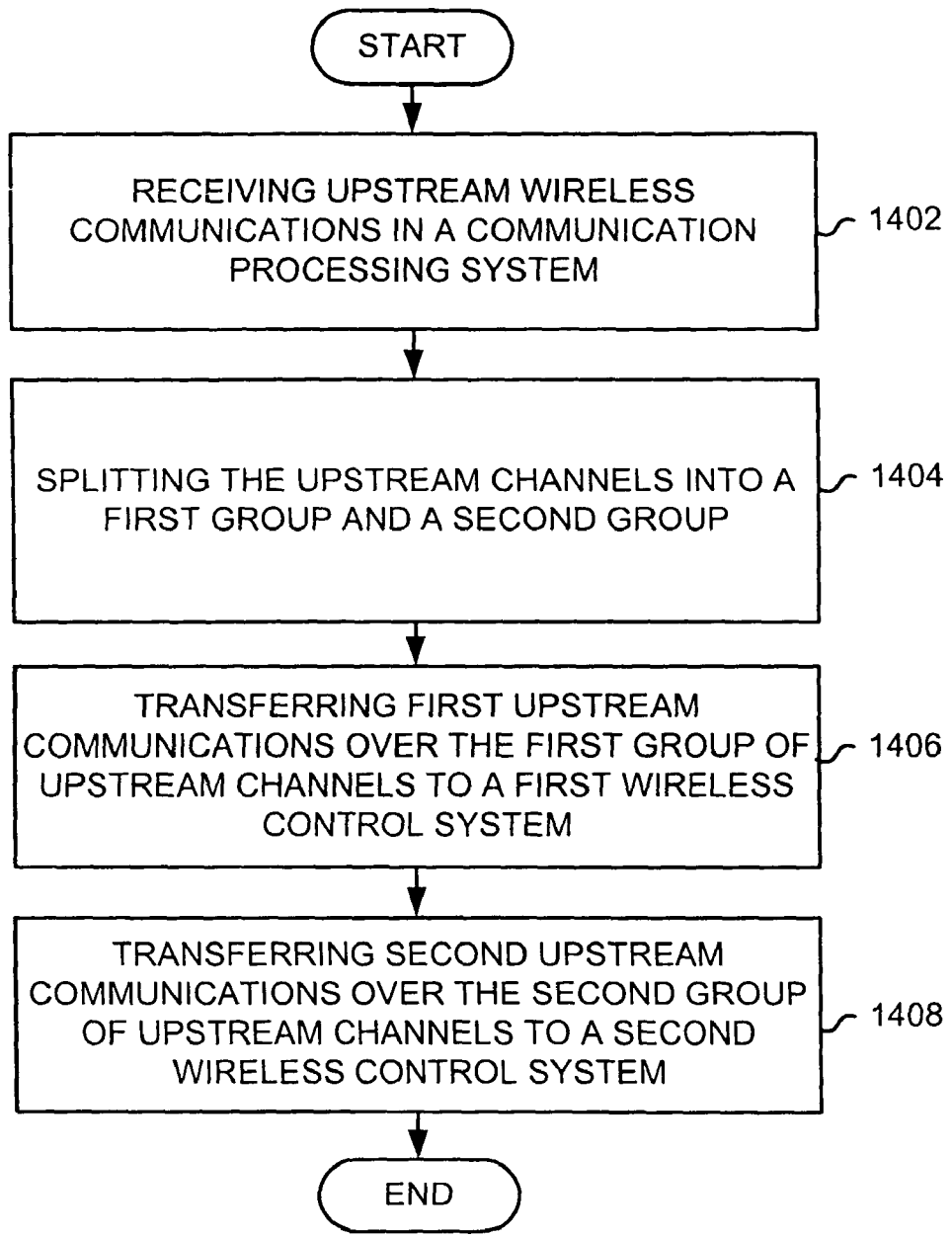
FIG. 14 depicts a flow diagram of another example of further steps of the method of FIG. 12 in an example of the invention.

Method for Adjusting a Communication System—FIGS. 12-14

FIGS. 12-14 discloses one embodiment of the invention, but the invention is not restricted to the method provided below. Those skilled in the art will appreciate numerous variations of the method that are within the scope of the invention. Those skilled in the art will also appreciate how the principles illustrated in this example can be used in other examples of the inventions.

FIG. 12 is a flow diagram of a method 1200 of adjusting a communication system for increased performance in an example of the invention. Method 1200 includes step 1202 of obtaining a first wireless control system configured to receive upstream wireless communications from a user over a first number of upstream channels. One example of the first wireless control system is the CMU-2000 from Hybrid Networks, Inc. One example of the upstream wireless communications is communications in a Multichannel Multipoint Distribution Service (MMDS) frequency range. The first number of upstream channels is comprised of a single contention channel and a plurality of bearer channels. The first wireless control system is further configured to receive requests from the user over the single contention channel for access to the bearer channels. The first wireless control system then grants the user access to one or more of the bearer channels responsive to the first requests.

Method 1200 further includes step 1204 of decreasing a bandwidth of each of the first number of upstream channels to generate a second number of upstream channels. The second number of upstream channels is greater than the first number of upstream channels. For instance, current wireless control systems, such as the CMU-2000-14C, operate with upstream channels each having a bandwidth of approximately 200 kHz.

Step 1204 could include reducing the bandwidth of each of the upstream channels to 166 kHz, 160 kHz, or some other bandwidth less than 200 kHz.

Method 1200 further includes step 1206 of operating at least two of the second number of upstream channels as contention channels. Method 1200 further includes step 1208 of operating the remainder of the upstream channels as bearer channels to generate a second plurality of bearer channels.

FIG. 13 depicts a flow diagram of one example of further steps of method 1200 in an example of the invention. Step 1302 includes receiving the upstream wireless communications from the user over the second number of upstream channels in the first wireless control system and a second wireless control system. Step 1304 includes receiving requests from the user, in the first wireless control system, over a first contention channel. Step 1306 includes, in the first wireless control system, granting the user access to at least one of the second plurality of bearer channels responsive to the requests. Step 1308 includes receiving requests from the user, in the second wireless control system, over a second contention channel. Step 1310 includes, in the second wireless control system, granting the user access to at least one of the second plurality of bearer channels responsive to the requests. For this example, the first and second wireless control systems could be upstream manager systems 1004 and 1006 depicted in FIG. 10.

FIG. 14 depicts a flow diagram of another example of further steps of method 1200 in an example of the invention. Step 1402 includes receiving the upstream wireless communications in a communication processing system. Step 1404 includes splitting the second number of upstream channels into a first group of upstream channels and a second group of upstream channels. The first group of upstream channels includes the first contention channel and a first portion of the second plurality of bearer channels. The second group of upstream channels includes the second contention channel and a second portion of the second plurality of bearer channels. Step 1406 includes transferring first upstream communications over the first group of upstream channels to the first wireless control system. Step 1408 includes transferring second upstream communications over the second group of upstream channels to the second wireless control system. For this example, the first and second wireless control systems could be upstream manager systems 1004 and 1006 and the communication processing system could be communication processing system 1002 depicted in FIG. 10.

We claim:

1. A communication system comprising:
a plurality of downstream transmission systems configured to transmit downstream wireless communications to an area having a plurality of sectors over a plurality of downstream channels to a plurality of users in the plurality of sectors; and
a plurality of upstream receiver systems, wherein each of the plurality of upstream receiver systems is associated with one of the plurality of sectors and is configured to receive upstream wireless communications over a plurality of upstream channels from those of the plurality of users in the one of the plurality of sectors;
wherein, for each of the plurality of sectors, the plurality of upstream channels associated with the sector comprises multiple contention channels and a plurality of bearer channels, wherein each of the multiple contention channels is associated with a separate group of the plurality of bearer channels; and
wherein, for each of the plurality of sectors, the upstream receiver system associated with the sector is further configured to receive requests over each of the multiple contention channels, wherein each of the requests is for access to the group of the plurality of bearer channels associated with the one of the multiple contention channels carrying the request.

2. The communication system of claim 1 wherein each downstream transmission system of the plurality of downstream transmission systems is configured to transmit a portion of the downstream wireless communications to each sector of the plurality of sectors respectively.

3. The communication system of claim 1 wherein the downstream wireless communications are in a Multichannel Multipoint Distribution Service (MMDS) frequency range.

4. The communication system of claim 1 wherein the upstream wireless communications are in a Multichannel Multipoint Distribution Service (MMDS) frequency range.

5. The communication system of claim 1 wherein the plurality of upstream channels each have a bandwidth of less than 200 kiloHertz.

6. A method of operating a communication system, the method comprising:
transmitting downstream wireless communications to an area having a plurality of sectors over a plurality of downstream channels to a plurality of users in the plurality of sectors;
for each of the plurality of sectors, receiving upstream wireless communications over a plurality of upstream channels from those of the plurality of users in the sector, wherein the plurality of upstream channels comprises multiple contention channels and a plurality of bearer channels, wherein each of the multiple contention channels is associated with a separate group of the plurality of bearer channels; and
for each of the plurality of sectors, receiving requests over each of the multiple contention channels, wherein each of the requests is for access to the group of the plurality of bearer channels associated with the one of the multiple contention channels carrying the request.

7. The method of claim 6 comprising transmitting a portion of the downstream wireless communications to each sector of the plurality of sectors respectively.

8. The method of claim 6 wherein the downstream wireless communications are in a Multichannel Multipoint Distribution Service (MMDS) frequency range.

9. The method of claim 6 wherein the upstream wireless communications are in a Multichannel Multipoint Distribution Service (MMDS) frequency range.

10. The method of claim 6 wherein the plurality of upstream channels each have a bandwidth of less than 200 kiloHertz.

* * * * *